(12) United States Patent
Annan et al.

(10) Patent No.: US 9,204,286 B1
(45) Date of Patent: Dec. 1, 2015

(54) SYSTEM AND METHOD OF BRANDING AND LABELING A MOBILE DEVICE

(71) Applicant: Sprint Communications Company L.P., Overland Park, KS (US)

(72) Inventors: Brandon C. Annan, Westwood Hills, KS (US); John E. Belser, Olathe, KS (US); Dale S. Schempp, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 300 days.

(21) Appl. No.: 13/844,104

(22) Filed: Mar. 15, 2013

(51) Int. Cl.
H04M 3/00 (2006.01)
H04W 8/22 (2009.01)

(52) U.S. Cl.
CPC ........................................ *H04W 8/22* (2013.01)

(58) Field of Classification Search
CPC ....... H04W 4/00; H04W 4/001; H04W 4/003; H04W 8/22–8/30; H04W 8/245
See application file for complete search history.

(56) References Cited

U.S. PATENT DOCUMENTS

| 6,131,024 | A  | 10/2000 | Boltz |
| 6,445,914 | B1 | 9/2002 | Findikli et al. |
| 7,165,191 | B1 | 1/2007 | Vakrat |
| 7,260,382 | B1 | 8/2007 | Lamb et al. |
| 7,266,371 | B1 | 9/2007 | Amin et al. |
| 7,493,111 | B2 | 2/2009 | Knowles |
| 7,817,988 | B2 | 10/2010 | Kruis et al. |
| 7,904,895 | B1 | 3/2011 | Cassapakis et al. |
| 7,991,988 | B2 | 8/2011 | Chen |
| 8,107,926 | B2 | 1/2012 | Goto |
| 8,185,097 | B2 | 5/2012 | Vanderlinden et al. |
| 8,185,101 | B1 | 5/2012 | Wiseman et al. |
| 8,249,654 | B1 | 8/2012 | Zhu |
| 8,260,281 | B2 | 9/2012 | Urbanek |
| 8,401,538 | B2 | 3/2013 | Urbanek |

(Continued)

FOREIGN PATENT DOCUMENTS

WO 2012078753 A1 6/2012
WO 2013169983 A1 11/2013

(Continued)

OTHER PUBLICATIONS

Foreign Communication from a Related Counterpart—International Search Report and Written Opinion, dated May 19, 2014, PCT/US14/13936, filed on Jan. 30, 2014.

(Continued)

*Primary Examiner* — San Htun

(57) ABSTRACT

In an embodiment, a method of branding a mobile device is disclosed. The method comprises installing a service brand package on the mobile device, where the service brand package is configured to provision the mobile device with a service brand network. The method further comprises receiving at least one signal on the mobile device, wherein the signal informs the mobile device of its geographic location. The method further comprises associating, by the mobile device, the geographic location of the mobile device with the location of a mobile service brand center, wherein the mobile service brand center is associated with the brand network. The method further comprises provisioning the mobile device with the brand network based on the association of the geographic location of the mobile device with the mobile service brand center, wherein provisioning comprises activating the service brand package.

20 Claims, 9 Drawing Sheets

(56) References Cited

U.S. PATENT DOCUMENTS

| | | |
|---|---|---|
| 8,401,595 B2 | 3/2013 | Zhu et al. |
| 8,433,953 B1 | 4/2013 | Gaudette et al. |
| 8,442,521 B2 | 5/2013 | Fleischman et al. |
| 8,571,536 B2 | 10/2013 | Urbanek |
| 8,612,967 B1 | 12/2013 | Delker |
| 8,626,165 B1 | 1/2014 | Narasimhan et al. |
| 8,666,383 B1 | 3/2014 | Mauer et al. |
| 8,819,188 B2 | 8/2014 | Blatherwick et al. |
| 8,825,039 B2 | 9/2014 | Mizuguchi |
| 8,909,291 B1 | 12/2014 | Spanel et al. |
| 9,026,105 B2 | 5/2015 | Shipley et al. |
| 9,042,877 B1 | 5/2015 | Ghoshal et al. |
| 9,098,368 B1 | 8/2015 | Delker |
| 9,100,769 B2 | 8/2015 | Annan et al. |
| 9,100,819 B2 | 8/2015 | Annan et al. |
| 9,125,037 B2 | 9/2015 | Masterson et al. |
| 9,143,924 B1 | 9/2015 | Abou-El-Ella et al. |
| 2002/0091931 A1 | 7/2002 | Quick, Jr. et al. |
| 2003/0217145 A1 | 11/2003 | Leung et al. |
| 2004/0033798 A1 | 2/2004 | Robin et al. |
| 2004/0092248 A1 | 5/2004 | Kelkar et al. |
| 2004/0093109 A1 | 5/2004 | O'Connor et al. |
| 2004/0116163 A1 | 6/2004 | Kim et al. |
| 2004/0137890 A1 | 7/2004 | Kalke |
| 2004/0137891 A1 | 7/2004 | Clark et al. |
| 2004/0261041 A1 | 12/2004 | Parakkuth et al. |
| 2005/0079855 A1 | 4/2005 | Jethi et al. |
| 2005/0085222 A1 | 4/2005 | Przybilski et al. |
| 2005/0119001 A1 | 6/2005 | Watanabe |
| 2005/0188262 A1 | 8/2005 | Rosenman et al. |
| 2005/0197098 A1 | 9/2005 | Trossen |
| 2006/0025151 A1 | 2/2006 | Karaoguz et al. |
| 2006/0135144 A1 | 6/2006 | Jothipragasam |
| 2006/0154651 A1 | 7/2006 | Knowles |
| 2006/0203722 A1 | 9/2006 | Oommen |
| 2006/0208071 A1 | 9/2006 | Chang et al. |
| 2006/0235944 A1 | 10/2006 | Haslam |
| 2006/0236325 A1 | 10/2006 | Rao et al. |
| 2006/0246949 A1 | 11/2006 | Gupta et al. |
| 2007/0004404 A1 | 1/2007 | Buckley et al. |
| 2007/0015538 A1 | 1/2007 | Wang |
| 2007/0082655 A1 | 4/2007 | Link, II et al. |
| 2007/0099599 A1 | 5/2007 | Smith et al. |
| 2007/0129057 A1 | 6/2007 | Xu et al. |
| 2007/0130156 A1 | 6/2007 | Tenhunen et al. |
| 2007/0165654 A1 | 7/2007 | Chai et al. |
| 2007/0169084 A1 | 7/2007 | Frank et al. |
| 2007/0190939 A1 | 8/2007 | Abel |
| 2007/0197234 A1 | 8/2007 | Gill et al. |
| 2007/0250645 A1 | 10/2007 | Meadows et al. |
| 2007/0254635 A1 | 11/2007 | Montelius |
| 2008/0039114 A1 | 2/2008 | Phatak et al. |
| 2008/0046583 A1 | 2/2008 | Rao |
| 2008/0046880 A1 | 2/2008 | Jun et al. |
| 2008/0046997 A1 | 2/2008 | Wang |
| 2008/0062900 A1 | 3/2008 | Rao |
| 2008/0065753 A1 | 3/2008 | Rao |
| 2008/0109662 A1 | 5/2008 | Natarajan et al. |
| 2008/0146280 A1 | 6/2008 | Sasse et al. |
| 2008/0167027 A1 | 7/2008 | Gautier et al. |
| 2008/0171532 A1 | 7/2008 | Shieh et al. |
| 2008/0225806 A1 | 9/2008 | Arian et al. |
| 2008/0281511 A1 | 11/2008 | Miyata |
| 2008/0300967 A1 | 12/2008 | Buckley et al. |
| 2008/0318547 A1 | 12/2008 | Ballou, Jr. et al. |
| 2009/0061840 A1 | 3/2009 | Fleischman et al. |
| 2009/0093242 A1 | 4/2009 | Bhalekar et al. |
| 2009/0094350 A1 | 4/2009 | Rive et al. |
| 2009/0106200 A1 | 4/2009 | Salinas et al. |
| 2009/0124250 A1 | 5/2009 | Topaltzas et al. |
| 2009/0156190 A1* | 6/2009 | Fisher .................. 455/418 |
| 2009/0156209 A1 | 6/2009 | Franklin et al. |
| 2009/0239518 A1 | 9/2009 | Feuillette |
| 2009/0247124 A1 | 10/2009 | de Atley et al. |
| 2009/0260004 A1 | 10/2009 | Datta et al. |
| 2009/0307763 A1 | 12/2009 | Rawlins et al. |
| 2010/0048193 A1 | 2/2010 | Ortion et al. |
| 2010/0060456 A1 | 3/2010 | Forster |
| 2010/0075669 A1 | 3/2010 | Sparks et al. |
| 2010/0080143 A1 | 4/2010 | Topaltzas et al. |
| 2010/0133335 A1 | 6/2010 | Maguid et al. |
| 2010/0136960 A1 | 6/2010 | Knezevic |
| 2010/0159876 A1 | 6/2010 | Brown et al. |
| 2010/0161724 A1 | 6/2010 | Sathyan et al. |
| 2010/0167696 A1 | 7/2010 | Smith et al. |
| 2010/0192120 A1 | 7/2010 | Raleigh |
| 2010/0203864 A1 | 8/2010 | Howard |
| 2010/0207742 A1 | 8/2010 | Buhot et al. |
| 2010/0222031 A1 | 9/2010 | Carolan et al. |
| 2010/0222047 A1* | 9/2010 | Vanderlinden et al. ........ 455/418 |
| 2010/0262638 A1 | 10/2010 | Fitzgerald |
| 2010/0291898 A1 | 11/2010 | Sanding et al. |
| 2010/0311404 A1 | 12/2010 | Shi et al. |
| 2010/0312794 A1 | 12/2010 | Liu |
| 2010/0325622 A1 | 12/2010 | Morton |
| 2010/0332639 A1 | 12/2010 | Diaz et al. |
| 2011/0003590 A1 | 1/2011 | Yoon et al. |
| 2011/0014913 A1 | 1/2011 | Yoon et al. |
| 2011/0026501 A1 | 2/2011 | Sharaga et al. |
| 2011/0028138 A1 | 2/2011 | Davies-Moore et al. |
| 2011/0030062 A1* | 2/2011 | Hsu et al. .................. 726/26 |
| 2011/0035421 A1 | 2/2011 | Laird-McConnell et al. |
| 2011/0081885 A1 | 4/2011 | Sennett et al. |
| 2011/0119716 A1 | 5/2011 | Coleman, Sr. |
| 2011/0138074 A1 | 6/2011 | Onda et al. |
| 2011/0161659 A1 | 6/2011 | Himawan et al. |
| 2011/0165836 A1 | 7/2011 | Dixon et al. |
| 2011/0173685 A1 | 7/2011 | Chai et al. |
| 2011/0202680 A1 | 8/2011 | Bells et al. |
| 2011/0202976 A1 | 8/2011 | Chow et al. |
| 2011/0208338 A1 | 8/2011 | Eteminan et al. |
| 2011/0222404 A1 | 9/2011 | Watson et al. |
| 2011/0230136 A1 | 9/2011 | Washiro |
| 2011/0258249 A1 | 10/2011 | Biggs et al. |
| 2011/0263294 A1 | 10/2011 | Kim et al. |
| 2011/0294484 A1 | 12/2011 | Martin et al. |
| 2011/0296399 A1 | 12/2011 | Tugnawat et al. |
| 2011/0306318 A1 | 12/2011 | Rodgers et al. |
| 2011/0314129 A1 | 12/2011 | Rezaiifar et al. |
| 2012/0027059 A1 | 2/2012 | Zhao et al. |
| 2012/0035989 A1 | 2/2012 | Abel et al. |
| 2012/0036282 A1 | 2/2012 | Chen et al. |
| 2012/0046022 A1 | 2/2012 | Kalke et al. |
| 2012/0047227 A1 | 2/2012 | Haggerty et al. |
| 2012/0094684 A1* | 4/2012 | Reddy .................. 455/456.1 |
| 2012/0106509 A1 | 5/2012 | Klingenbrunn et al. |
| 2012/0129513 A1 | 5/2012 | van der Laak |
| 2012/0129572 A1 | 5/2012 | Johnstone et al. |
| 2012/0135733 A1 | 5/2012 | Cormier et al. |
| 2012/0158580 A1 | 6/2012 | Eram et al. |
| 2012/0203824 A1 | 8/2012 | Oommen |
| 2012/0208511 A1 | 8/2012 | Vanderlinden et al. |
| 2012/0230587 A1 | 9/2012 | Arseneau |
| 2012/0260095 A1 | 10/2012 | Von Hauck et al. |
| 2012/0276872 A1 | 11/2012 | Knauth et al. |
| 2012/0282891 A1 | 11/2012 | Mohammed et al. |
| 2012/0282924 A1 | 11/2012 | Tagg et al. |
| 2013/0010641 A1 | 1/2013 | Dinan |
| 2013/0023235 A1 | 1/2013 | Fan et al. |
| 2013/0031191 A1 | 1/2013 | Bott |
| 2013/0031234 A1 | 1/2013 | Alfano et al. |
| 2013/0041988 A1 | 2/2013 | Rodermund et al. |
| 2013/0046951 A1 | 2/2013 | Jones |
| 2013/0065578 A1 | 3/2013 | Raleigh et al. |
| 2013/0072168 A1* | 3/2013 | Colucciello et al. ........ 455/414.1 |
| 2013/0085914 A1 | 4/2013 | McPherson et al. |
| 2013/0111461 A1 | 5/2013 | Zubas et al. |
| 2013/0137417 A1 | 5/2013 | Urbanek |
| 2013/0196647 A1 | 8/2013 | Raleigh et al. |
| 2013/0198567 A1 | 8/2013 | Ahmed et al. |
| 2013/0222395 A1 | 8/2013 | Blas, Jr. |
| 2013/0303142 A1 | 11/2013 | Burcham et al. |
| 2013/0310003 A1 | 11/2013 | Sadhvani et al. |
| 2013/0311836 A1 | 11/2013 | Hurst et al. |

(56) References Cited

U.S. PATENT DOCUMENTS

| | | |
|---|---|---|
| 2014/0045483 A1 | 2/2014 | Whidden |
| 2014/0075567 A1 | 3/2014 | Raleigh et al. |
| 2014/0080467 A1 | 3/2014 | Urbanek |
| 2014/0113610 A1 | 4/2014 | Ramprasad et al. |
| 2014/0206313 A1 | 7/2014 | Spanel et al. |
| 2014/0228012 A1 | 8/2014 | Annan et al. |
| 2014/0228042 A1 | 8/2014 | Annan et al. |
| 2014/0274032 A1 | 9/2014 | Shipley et al. |
| 2014/0373184 A1 | 12/2014 | Mahaffey et al. |
| 2015/0065105 A1 | 3/2015 | Masterson et al. |
| 2015/0111564 A1 | 4/2015 | Urbanek |
| 2015/0111565 A1 | 4/2015 | Urbanek |

FOREIGN PATENT DOCUMENTS

| | | |
|---|---|---|
| WO | 2014046814 A1 | 3/2014 |
| WO | WO2014113128 A1 | 7/2014 |
| WO | WO2014123758 A1 | 8/2014 |
| WO | WO2014123759 A1 | 8/2014 |
| WO | WO2014158430 A1 | 9/2014 |
| WO | WO2015030945 A1 | 3/2015 |
| WO | WO2015060965 A2 | 4/2015 |

OTHER PUBLICATIONS

Foreign Communication from a Related Counterpart—International Search Report and Written Opinion, dated May 14, 2014, PCT/US14/13939, filed on Jan. 30, 2014.
First Action Interview Pre-Interview Communication dated Apr. 23, 2014, U.S. Appl. No. 13/622,234, filed Sep. 18, 2012.
First Action Interview Pre-Interview Communication dated Apr. 3, 2014, U.S. Appl. No. 13/763,434, filed Feb. 8, 2013.
First Action Interview Pre-Interview Communication dated Aug. 13, 2013, U.S. Appl. No. 13/335,941, filed Dec. 23, 2011.
Notice of Allowance dated Oct. 9, 2013, U.S. Appl. No. 13/335,941, filed Dec. 23, 2011.
Delker, Jason R., "Loading Branded Media Outside System Partition", filed Oct. 30, 2013 U.S. Appl. No. 14/066,947.
Foreign Communication from a Related Counterpart—International Search Report and Written Opinion, dated Nov. 14, 2013, PCT/US13/55023, filed on Aug. 15, 2013.
Mauer, Brian D., et al., "Automatic Branding of Generic Applications", filed Jan. 10, 2013, U.S. Appl. No. 14/152,627.
Urbanek, Robert E., "Generic Mobile Devices Customization Framework", filed Aug. 15, 2013, International Serial No. PCT/US13/55023.
Annan, Brandon C., et al.,"System and Method of Storing Service Brand Packages on a Mobile Device", filed Jan. 30, 2014, International Serial No. PCT/US14/13936.
Annan, Brandon C., et al.,"System and Method of Provisioning and Reprovisioning a Mobile Device Based on Self-locating", filed filed Jan. 30, 2014, International Serial No. PCT/US14/13939.
Foreign Communication from a Related Counterpart Application, "Preliminary Report on Patentability", dated Jun. 20, 2013, PCT/US2011/063736 filed on Dec. 7, 2011.
Foreign Communication from a Related Counterpart—International Search Report and Written Opinion, dated Jul. 24, 2013, PCT/US13/40278, filed on May 9, 2013.
Notice of Allowance dated Jun. 21, 2013, U.S. Appl. No. 13/752,386, filed Jan. 28, 2013.
Notice of Allowance dated Aug. 9, 2013, U.S. Appl. No. 13/149,505, filed May 31, 2013.
First Action Interview Pre-Interview Communication dated Sep. 22, 2014, U.S. Appl. No. 13/468,028, filed May 9, 2013.
Final Office Action dated Sep. 19, 2014, U.S. Appl. No. 13/622,234, filed Sep. 18, 2012.
FAIPP Pre-Interview Communication dated Mar. 19, 2014, U.S. Appl. No. 13/744,847, filed Jan. 18, 2013.
Notice of Allowance dated Aug. 4, 2014, U.S. Appl. No. 13/744,847, filed Jan. 18, 2013.
FAIPP Pre-Interview Communication dated Jul. 16, 2014, U.S. Appl. No. 13/744,861, filed Jan. 18, 2013.
Final Office Action dated Aug. 19, 2014, U.S. Appl. No. 13/763,434, filed Feb. 8, 2013.
Office Action dated Aug. 7, 2014, U.S. Appl. No. 13/831,504, filed Mar. 14, 2013.
Foreign Communication From a Related Counterpart Application, International Search Report and Written Opinion dated Jan. 24, 2014, International Application No. PCT/US13/68981 filed on Nov. 7, 2013.
Spanel, Robert L., et al., Patent Application entitled "Dynamic Remotely Managed SIM Profile" U.S. Appl. No. 13/744,847, filed Jan. 18, 2013.
Urbanek, Robert E., "Delivery of Branding Content and Customizations to a Mobile Communication Device", filed Oct. 23, 2013, U.S. Appl. No. 14/060,712.
Urbanek, Robert E., "Delivery of Branding Content and Customizations to a Mobile Communication Device", filed , 201, International Serial No. PCT/US14/56778, Filed on Sep. 22, 2014.
Urbanek, Robert E., "Implementation of Remotely Hosted Branding Content and Customizations", filed Oct. 23, 2013, U.S. Appl. No. 14/085,474.
Urbanek, Robert E., "Subscriber Identity Module Virtualization", filed Nov. 20, 2013, U.S. Appl. No. 14/060,719.
Indurkar, Dhananjay, "System and Method of Branding a Device Independent of Device Activation", filed Jan. 24, 2014, U.S. Appl. No. 14/163,035.
Sumner, Bret D., "Directing Server Connection Based on Location Identifier", filed Aug. 15, 2013, U.S. Appl. No. 13/968,259.
Abou-El-Ella, Hassan, et al., "Segmented Customization Payload Delivery", filed Aug. 27, 2013, U.S. Appl. No. 14/010,518.
Sumner, Bret D., "Segmented Customization Package Within Distributed Server Architecture", filed Aug. 27, 2013, U.S. Appl. No. 14/010,522.
Masterson, Michelle E., et al., "Development and Testing of Payload Receipt by a Portable Electronic Device", filed Aug. 27, 2013, U.S. Appl. No. 14/010,523.
Masterson, Michelle E., et al., "System and Methods for Deferred and Remote Device Branding", filed Aug. 27, 2013, U.S. Appl. No. 14/010,524.
Masterson, Michelle E., et al., "System and Methods for Deferred and Remote Device Branding", filed Jul. 16 , 2014, International Serial No. PCT/US14/46773.
Callan, Jeffery S., et al., "Delivery of Oversized Branding Elements for Customization", filed Nov. 6, 2013, U.S. Appl. No. 14/073,321.
Indurkar, Dhananjay, "Background Delivery of Device Configuration and Branding", filed Jan. 16, 2014, U.S. Appl. No. 14/157,507.
Ahn, Chul Jin, et al., "Separation of Client Identification Composition from Customization Payload to Original Equipment Manufacturer Layer", filed Nov. 8, 2013, U.S. Appl. No. 14/075,687.
Ghoshal, Jagannath, et al., "Multiple Carrier Partition Dynamic Access on a Mobile Device", filed Jun. 5, 2014, U.S. Appl. No. 14/297,429.
Indurkar, Dhananjay, "Activation Sequence Using Permission Based Connection to Network", filed Jan. 24, 2014, U.S. Appl. No. 14/163,041.
Ahn, Chul Jin, et al., "Customization for Preloaded Applications", filed Mar. 31, 2014, U.S. Appl. No. 14/231,718.
Foreign Communication from a Related Counterpart—International Search Report and Written Opinion, dated Jun. 3, 2014,PCT/US14/16650, filed on Feb. 16, 2014.
Foreign Communication from a Related Counterpart—International Search Report and Written Opinion, PCT/US2011/063736.
Notice of Allowance dated Apr. 26, 2012, U.S. Appl. No. 12/962,620, filed Dec. 7, 2010.
Notice of Allowance dated Nov. 2, 2012, U.S. Appl. No. 13/556,202, filed Jul. 24, 2012.
First Action Interview Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Urbanek, Robert E., "System and Method of Wireless Communication", filed Dec. 7, 2010, U.S. Appl. No. 12/962,620.

(56) References Cited

OTHER PUBLICATIONS

Urbanek, Robert E., "System and Method for Generic Mobile Phone Configuration", filed Jul. 24, 2012, U.S. Appl. No. 13/556,202.
Urbanek, Robert E., "System and Method for Generic Mobile Phone Configuration", filed Jan. 28, 2013, U.S. Appl. No. 13/752,386.
Delker, Jason R., "Loading Branded Media Outside System Partition", filed May 31, 2011 U.S. Appl. No. 13/149,505.
Burcham, Robert H., et al., "Self-Identification of Brand and Branded Firmware Installation in a Generic Electronic Device", filed May 9, 2012 U.S. Appl. No. 13/468,028.
Mauer, Brian D., et al., "Automatic Branding of Generic Applications", filed Dec. 23, 2011 U.S. Appl. No. 13/335,941.
Urbanek, Robert E, "Generic Mobile Devices Customization Framework", filed Sep. 18, 2012, U.S. Appl. No. 13/622,234.
Annan, Brandon C., et al.,"System and Method of Storing Service Brand Packages on a Mobile Device", filed Feb. 8, 2013, U.S. Appl. No. 13/763,428.
Annan, Brandon C., et al.,"System and Method of Provisioning and Reprovisioning a Mobile Device Based on Self-locating", filed Feb. 8, 2013, U.S. Appl. No. 13/763,434.
Annan, Brandon C., et al.,"Electronic Fixed Brand Labeling", filed Feb. 8, 2013, U.S. Appl. No. 13/763,443.
Ghoshal, Jagannath, et al.,"Rebranding a Portable Electronic Device While Maintaining User Data", filed May 22, 2013, U.S. Appl. No. 13/899,567.
Ghoshal, Jagannath, et al., "System and Method for Retrofitting for Branding Framework into a Mobile Communication Device", May 21, 2013, U.S. Appl. No. 13/899,566.
Advisory Action dated Dec. 17, 2014, U.S. Appl. No. 13/622,234, filed Sep. 18, 2012.
Notice of Allowance dated Nov. 22, 2014, U.S. Appl. No. 13/744,861, filed Jan. 18, 2013.
First Action Interview Pre-Interview Communication dated Oct. 22, 2014, U.S. Appl. No. 13/763,428, filed Feb. 8, 2013.
Notice of Allowance dated Dec. 29, 2014, U.S. Appl. No. 13/831,504, filed Mar. 14, 2013.
First Action Interview Pre-Interview Communication dated Nov. 20, 2014, filed on May 21, 2013.
Foreign Communication from a Related Counterpart Application, "Preliminary Report on Patentability," dated Nov. 20, 2014, PCT/US13/40278 filed on May 9, 2013.
Foreign Communication from a Related Counterpart—International Search Report and Written Opinion, dated Dec. 17, 2014, PCT/US14/46773, filed on Jul. 16, 2014.
Foreign Communication from a Related Counterpart—International Search Report and Written Opinion, dated Dec. 30, 2014, PCT/US14/56778, filed Sep. 22, 2014.
Spanel, Robert L., et al., Patent Application entitled "Dynamic Remotely Managed SIM Profile" U.S. Appl. No. 14/522,586, filed Oct. 24, 2014.
Urbanek, Robert E, "Delivery of Branding Content and Customizations to a Mobile Communication Device", filed Sep. 22, 2014, International Serial No. PCT/US14/56778.
Koller, Gary D., et al., "Out of the Box Experience (OOBE) Country Choice Using Wi-Fi Layer Transmission," filed Oct. 31, 2014, U.S. Appl. No. 14/530,666.
Blinn, Benjamin P., et al. "System and Method of Efficient Mobile Device Network Brand Customization," filed Sep. 2, 2014, U.S. Appl. No. 14/475,399.
First Action Interview Office Action dated Mar. 16, 2015, U.S. Appl. No. 13/468,028, filed May 9, 2013.
Office Action dated Mar. 2, 2015, U.S. Appl. No. 13/622,234, filed Sep. 18, 2012.
FAIPP Pre-Interview Communication dated Mar. 26, 2015, U.S. Appl. No. 14/522,586, filed Oct. 24, 2014.
Notice of Allowance dated Mar. 20, 2015, U.S. Appl. No. 13/763,428, filed Feb. 8, 2013.
Notice of Allowance dated Mar. 26, 2015, U.S. Appl. No. 13/763,434, filed Feb. 8, 2013.
FAIPP Pre-Interview Communication dated Mar. 12, 2015, U.S. Appl. No. 13/972,827, filed Aug. 21, 2013.
Notice of Allowance dated Jan. 22, 2015, U.S. Appl. No. 13/899,566, filed May 21, 2013.
FAIPP Pre-Interview Communication dated Apr. 15, 2015, U.S. Appl. No. 14/060,712, filed Nov. 20, 2013.
FAIPP Pre-Interview Communication dated Mar. 4, 2015, U.S. Appl. No. 14/010,518, filed Aug. 27, 2013.
FAIPP Pre-Interview Communication dated Apr. 1, 2015, U.S. Appl. No. 14/010,522, filed Aug. 27, 2013.
FAIPP Pre-Interview Communication dated Apr. 3, 2015, U.S. Appl. No. 14/010,523, filed Aug. 27, 2013.
FAIPP Pre-Interview Communication dated Mar. 10, 2015, U.S. Appl. No. 14/010,524, filed Aug. 27, 2013.
FAIPP Pre-Interview Communication dated Apr. 8, 2015, U.S. Appl. No. 14/157,507, filed Jan. 16, 2014.
Foreign Communication from a Related Counterpart—International Preliminary Report on Patentability, dated Apr. 2, 2015, PCT/US13/55023, filed on Aug. 15, 2013.
Ghoshal, Jagannath, et al., "Multi-Step Mobile Device Initiation with Intermediate Partial Reset," filed Aug. 21, 2013, U.S. Appl. No. 13/972,827.
Delker, Jason R., et al. "Subscriber Identity Module (SIM) Card Initiation of Custom Application Launcher Installation Installation on a Mobile Communication Device," filed Mar. 4, 2015, U.S. Appl. No. 14/639,056.
Delker, Jason R., et al. "Network Access Tiered Based on Application Launcher Installation," filed Mar. 4, 2015, U.S. Appl. No. 14/639,060.
FAIPP Pre-Interview Communication dated Jun. 2, 2015, U.S. Appl. No. 14/152,627, filed Jan. 10, 2013.
Notice of Allowance dated Jul. 7, 2015, U.S. Appl. No. 14/522,586, filed Oct. 24, 2014.
FAIPP Pre-Interview Communication dated Apr. 23, 2014, U.S. Appl. No. 13/763,443, filed Feb. 8, 2013.
First Action Interview Office Action dated Jun. 16, 2014, U.S. Appl. No. 13/763,443, filed Feb. 8, 2013.
Office Action dated Jun. 16, 2015, U.S. Appl. No. 13/899,567, filed May 22, 2013.
Notice of Allowance dated May 7, 2015, U.S. Appl. No. 13/972,827, filed Aug. 21, 2013.
Notice of Allowance dated May 29, 2015, U.S. Appl. No. 14/085,474, filed Nov. 20, 2013.
Notice of Allowance dated May 8, 2015, U.S. Appl. No. 14/010,518, filed Aug. 27, 2013.
Notice of Allowance dated Jul. 8, 2015, U.S. Appl. No. 14/010,522, filed Aug. 27, 2013.
Notice of Allowance dated Jun. 26, 2015, U.S. Appl. No. 14/010,523, filed Aug. 27, 2013.
Notice of Allowance dated Apr. 28, 2015, U.S. Appl. No. 14/010,524, filed Aug. 27, 2013.
Restriction Requirement dated May 21, 2015, U.S. Appl. No. 14/073,321, filed Nov. 6, 2013.
FAIPP Pre-Interview Communication dated Jul. 8, 2015, U.S. Appl. No. 14/475,399, filed Sep. 2, 2014.
Amazon Kindle e-book reader, on public sale 2007, http://en.wikipedia.orglwiki/Amazon_Kindle. last accessed on Apr. 13, 2015.
Foreign Office Action dated Jul. 7, 2015, Japanese Application Serial No. 2013-543310, filed Jul. 7, 2015.
Notice of Allowance dated Aug. 6, 2015, U.S. Appl. No. 14/152,627, filed Jan. 10, 2013.
Notice of Allowance dated Jul. 15, 2015, U.S. Appl. No. 13/622,234, filed on Sep. 18, 2012.
Final Office Action dated Aug. 10, 2015, U.S. Appl. No. 13/763,443, filed Feb. 8, 2013.
FAIPP Pre-Interview Communication dated Sep. 29, 2015, U.S. Appl. No. 14/163,035, filed Jan. 24, 2014.
FAIPP Pre-Interview Communication dated Aug. 20, 2015, U.S. Appl. No. 14/073,321, filed Nov. 6, 2013.

(56) References Cited

OTHER PUBLICATIONS

FAIPP Pre-Interview Communication dated Jul. 15, 2015, U.S. Appl. No. 14/163,041, filed Jan. 24, 2014.
FAIPP Pre-Interview Communication dated Sep. 21, 2015, U.S. Appl. No. 14/231,718, filed Mar. 31, 2014.
Foreign Communication From a Related Counterpart Application, International Preliminary Report on Patentability dated Jul. 30, 2015, PCT/US13/68981, filed on Nov. 7, 2013.
Foreign Communication From a Related Counterpart Application, International Preliminary Report on Patentability dated Aug. 20, 2015, PCT/US14/13936, filed on Jan. 30, 2014.
Foreign Communication From a Related Counterpart Application, International Preliminary Report on Patentability dated Aug. 20, 2015, PCT/US14/13939, filed on Jan. 30, 2014.
Foreign Communication From a Related Counterpart Application, International Preliminary Report on Patentability dated Sep. 24, 2015, PCT/US14/16650, filed on Feb. 16, 2014.
Dummies, "Power Modes on Your Kindle Paperwhite", http://dummies.comlhow-to/content/power-modes-on-yourkindle-paperwhite.html, last accessed on Jul. 31, 2015.
Cushings, "Buy Your Kindle At Waterstones? You're Now Locked Into One Sceensaver . . .The Waterstones Logo", https://www.techdirt.com/articles/20121206/16014421285/buy-your-kindle-waterstones-youre-now-locked-into-onescreensaver-waterstones-logo.shtml, last accessed Aug. 3, 2015.
Wikipedia, Extended Display Identification Data, https://en.wikipedia.org/wiki/Extended_Displayidentification_Data, last accessed Aug. 5, 2015.

* cited by examiner

SYSTEM AND METHOD OF BRANDING AND LABELING A MOBILE DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices used for mobile voice or data communication based on network connectivity provided by base stations known as cell towers or sites. Electronic devices may obtain network connectivity through base stations with one or more service networks. A service data package may be stored on the mobile device wherein the service data package may be configured to provision the mobile device with a service network. Mobile devices may be provisioned for a particular network after they are shipped from the mobile device manufacturer.

SUMMARY

In an embodiment, a method of branding a mobile device is disclosed. The method comprises installing a service brand package on the mobile device, where the service brand package is configured to provision the mobile device with a service brand network. The method further comprises receiving at least one signal on the mobile device, wherein the signal informs the mobile device of its geographic location. The method further comprises associating, by the mobile device, the geographic location of the mobile device with the location of a mobile service brand center, wherein the mobile service brand center is associated with the brand network. The method further comprises provisioning the mobile device with the brand network based on the association of the geographic location of the mobile device with the mobile service brand center, wherein provisioning comprises activating the service brand package.

In an embodiment, a system branding a mobile device is disclosed. The system comprises a mobile device configured to store a service brand package, where a service brand package is configured to provision the mobile device with a service brand network, receive at least one signal, wherein the signal informs the mobile device of its geographic location, and provision with the brand network based on the association of the geographic location of the mobile device with the mobile service brand center, wherein provisioning comprises activating the service brand package. The mobile device further comprises a processor. The mobile further comprises a transceiver. The mobile device further comprises a memory.

In an embodiment, a method labeling a mobile device is disclosed. The method comprises installing a service brand package on the mobile device, wherein the service brand package is configured to provision the mobile device with a service brand network. The method further comprises receiving at least one location signal on the mobile device, wherein the location signal informs the mobile device of its geographic location. The method further comprises associating, by the mobile device, the geographic location of the mobile device with the location of a mobile service brand center, wherein the mobile service brand center is associated with the brand network. The method further comprises transmitting a labeling signal to a mobile device packaging label based on the mobile service brand center associated with the location signal, wherein the labeling signal instructs the mobile device packaging label to display a label. These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
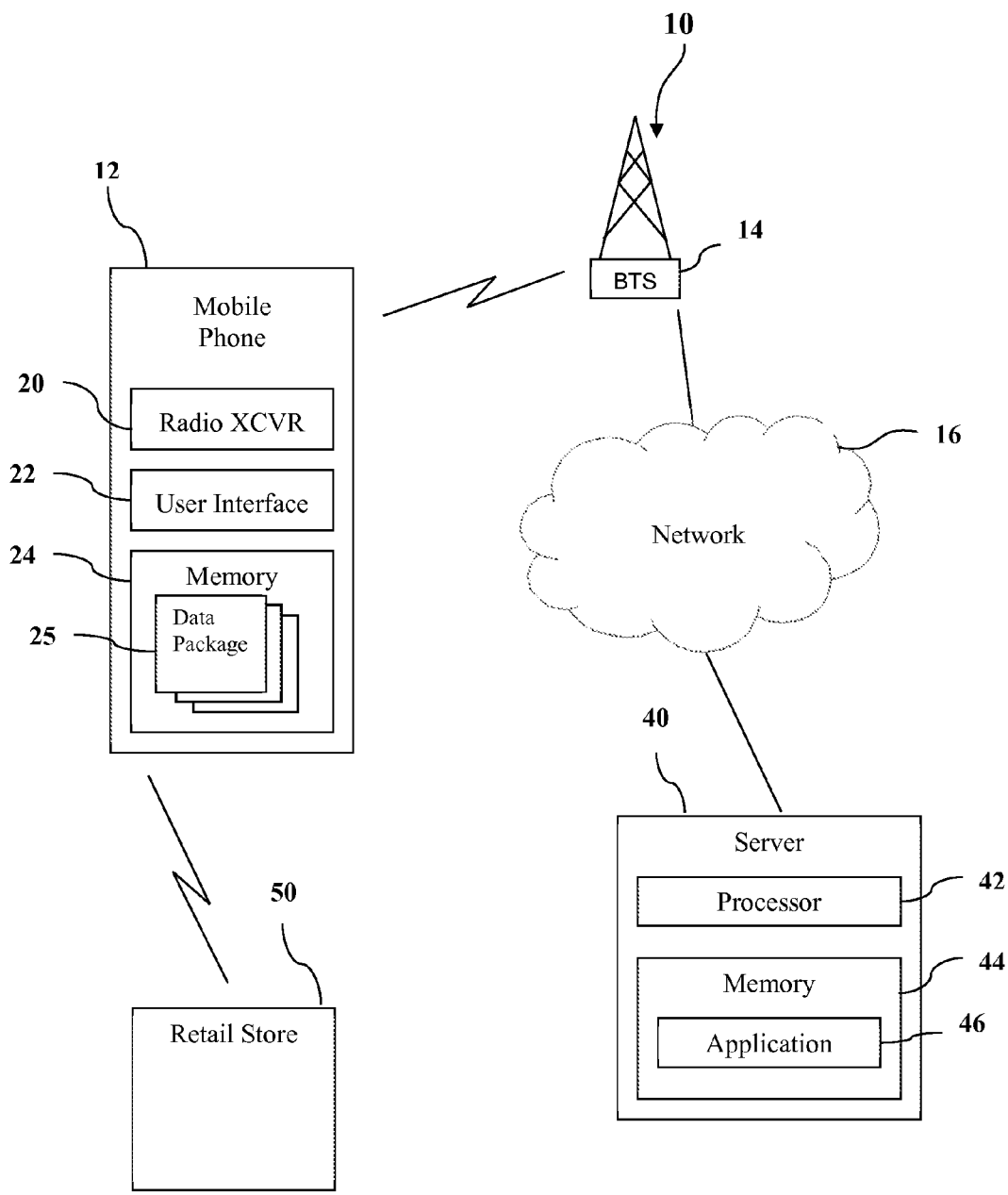
FIG. 1 is a block diagram of a provisioning system and labeling system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, a method and system for branding a mobile device is disclosed. This system will improve economies of scale, for example, by automatically provisioning, at least partially, a generic mobile device with a specific brand when it enters a mobile service brand center such as a retail store and/or distribution outlet associated with that specific brand. The mobile device may be configured with two or more service brand packages previously stored on the mobile device. Alternatively and/or additionally, the mobile device may receive two or more service brand packages, for example, when the mobile device enters a mobile service brand center such as a retail store and/or distribution outlet. Mobile devices may be manufactured with one or more service brand packages installed on them. The service brand packages may provide the instructions and/or some of the data for provisioning a mobile device with a particular service brand network. Installing multiple service brand packages on a mobile device when the mobile device is manufactured allows the manufacturer to manufacture one model mobile device for multiple service brands. This improves economies of scale for a manufacturer by reducing the number of parallel assembly lines for a particular mobile device. For example, a mobile device manufacturer can manufacture one mobile device for both Sprint and Boost Mobile by installing a service brand package for Sprint and a service brand package for Boost Mobile on the same mobile device. Initially, the service brand packages may be installed as dormant and/or inactive.

A service brand network may comprise a network which one or more service brands may provide mobile communication service on and/or through. In an embodiment, a service brand network may provide mobile service for only one service brand. For example, a first service brand network may allow a first service brand to provide mobile service. A second service brand network may allow a second service brand to provide mobile service. Thus each service brand network may be exclusive and/or dedicated to an associated service brand. In an embodiment, a service brand network may provide mobile service to two or more service brands. For example a first service brand network may provide mobile service for a first service brand and a second service brand. Thus, a service brand network may allow multiple service brands to provide mobile service though the same service brand network.

Additionally, once a mobile device is shipped to a mobile service retail store, the mobile device may provision with a particular service brand network when receiving a signal associating the location of the mobile device with the location of the mobile service brand center. For example, a batch of mobile devices as previously described may be ready for shipment to retail stores. Half of the batch may be designated for shipment to a Boost Mobile retail store while the other half of the batch may be designated for shipment to a Sprint retail store. Once the shipment of the Boost retail store reaches the store, the mobile devices may receive a signal informing the mobile devices of their geographic location, specifically, that they are located in a Boost Mobile retail store. The signal may be a GPS signal, a WLAN signal from the Boost retail store, a System Identification Number signal and/or a Network Identification Number signal (herein after an SID/NID signal) from a BTS tower in close proximity to the Boost retail store, and/or the like. In an embodiment, a look-up table may be installed on the mobile device or may be stored in a location accessible to the mobile device so that after determining its location the mobile device may associate its location with, in this example, the Boost Mobile retail store. Once the mobile device makes this association, the mobile device may activate the service brand package associated with Boost Mobile previously installed on the mobile device. The mobile device may also request, for example, via the WLAN of the Boost Mobile retail store, provisioning data to provision the mobile device with the Boost Mobile network. These features allow for quick and easy distribution of mobile devices to multiple different retailers and entail reduced preparation by clerks at the retail stores.

In an embodiment, a system and method for labeling a service brand package is disclosed. This system will improve economies of scale and hasten mobile phone distribution by automatically labeling a generic mobile device and/or packaging containing a generic mobile device with a label associated with a specific brand when it enters a mobile service brand center associated with that specific brand. Mobile devices similar to the mobile device previously described may also be packaged before being designated to a particular mobile service brand center (e.g. mobile service retail store) and with a particular brand network. The mobile device may be configured with two or more service brand packages previously stored on the mobile device. Alternatively and/or additionally, the mobile device may receive two or more service brand packages, for example, when the mobile device enters a mobile service brand center such as a retail store and/or distribution outlet.

A label may be installed on the outside of the mobile device as well as on the outside of the mobile device packaging. The label may be configured to display the brand network that the mobile device eventually becomes provisioned with. For example, the batch of mobile devices described above may also have labels attached to the mobile device covers as well as the boxes that the mobile devices are shipped in. Initially, before being assigned to a particular mobile service brand center (e.g. a retail store) and to a particular brand network the labels may display no markings on them. The mobile device may then receive at least one location signal informing the mobile device of its geographic location. The mobile device may then associate its geographic location with the location of a mobile service brand center associated with a service brand and/or service brand network. The mobile device may then transmit a labeling signal to a mobile device packaging label based on the mobile service brand center associated with the location signal. The labeling signal instructs the mobile device packaging label to display a label. For example, when a mobile device associates with a particular retail store, such as a Boost Mobile retail store and provisions with the Boost Mobile network, the mobile device transmits a Boost Mobile labeling signal to one or more packing labels located on the mobile device covers and the mobile device boxes display one or more Boost Mobile symbol(s).

Alternatively, when the mobile device is in a fulfillment center and is designated for shipment as a specific brand, a fulfillment station may differentially radiate the packaging label to cause the label information associated with the selected brand to be expressed. For example, the label may comprise dormant information associated with each of a plurality of brands, for example a first brand, a second brand, and a third brand. By radiating the label with differentially selected and/or generated radiation energy, the label information associated with the second brand may be caused to be visible. The differentiated radiation energy may be differentiated by frequency range, by polarization, by power level, or by other characteristics.

Turning now to FIG. 1, a communication system 10 is described. The system 10 comprises a mobile device 12, base transceiver stations (BTS) 14, a network 16, and a service awareness provisioning server 40. In an embodiment, the service awareness provisioning server 40 may be configured to store brand and/or network provisioning data associated with one or more networks. This data may comprise items like network credentials, branding and/or customization information, service parameters, default operating parameters, etc. It is understood that branding information and/or branding data may comprise a wide variety of items. This may include various branded graphics including but not limited to application splash screens, backgrounds, themes, wallpapers, icons, and images. This may include branded application executable instructions. This may include customized controls and switches. This may include interfaces such as a link to a branded on-line store. This may include an interface to a branded voicemail application such as a pre-loaded short code. This may include preferred universal reference locators that may be provided as pre-loaded favorites in a web browser or elsewhere on a presentation screen of the mobile device 12. This may include other media and settings.

In an embodiment, brand provisioning data may comprise provisioning data configured for a particular service brand. In an embodiment, network provisioning data may comprise provision data configured for a particular network. Thus, for example, if a first service brand and a second service brand are associated with a particular service brand network, then network provisioning data may be associated with both the first service brand and the second service brand. For example, the service awareness provisioning server may store provisioning data associated with a first network and provisioning data associated with a second network. The provisioning data is configured to be installed on the mobile device 12, as will be discussed further herein. In an embodiment, the system 10 may further comprise two or more service awareness provisioning servers 40. For example, a first service awareness provisioning server 40 may store provisioning data associated with a first network while a second service awareness provisioning server may store provisioning data associate with a second network.

In an embodiment, the system comprises a retail store 50. The retail store 50 comprises one or more signal transceivers configured to identify a mobile device with the service brand package employed by a brand and/or network associated with the retail store 50 and send provisioning data to the mobile device 12 to provision the mobile device 12 with the brand and/or network associated with the retail store 50. In an embodiment, the retail store may communicate with the mobile device 12 and transmit provisioning data to the mobile device 12 through a local base transceiver station (BTS), a retail store WLAN, and or the like.

The mobile device 12 may be a mobile phone, a personal digital assistant (PDA), a media player, or other communication enabled portable electronic device. In an embodiment, the mobile device 12 may be implemented as a handset. Details of handsets are discussed further hereinafter. The base transceiver station 14 provides a communication link to the mobile device 12 and couples the mobile device 12 to the network 16. In an embodiment, the base transceiver station 14 may provide wireless communication links to the mobile device 12 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While one base transceiver station 14 is illustrated in FIG. 1, it is understood that the communication system 10 may comprise one or more base transceiver stations 14 and any number of mobile devices 12. The network 16 may be a public communication network, a private communication network, or a combination thereof.

The mobile device 12 may comprise a radio transceiver 20, a first user interface 22, and a memory 24. Alternatively, the mobile device 12 may comprise two or more radio transceivers 20. In an embodiment, the memory 24 may store two or more service brand packages. For example, a first service brand package and a second service brand package may be stored in memory, such as memory 24, for example as service brand packages 25. A first service package may be configured to provision the mobile device for service with a first service network. A second service package may be configured to provision the mobile device for service with a second service network. The service brand packages such as the first service package and the second service package may comprise executables for provisioning the mobile device with a service network. One of ordinary skill in the art will appreciate after reading this disclosure the various elements comprising a service package which would allow a service package to provision a mobile device with a service network. The service awareness provisioning server 40 may comprise a processor 42, a memory 44, and an application 46 stored in the memory 44. The service awareness provisioning server 40 may also comprise a plurality of processors located in a plurality of computers. Computers are discussed in more detail hereinafter.

The application 46, when executed by the processor 42 of the service awareness provisioning server 40, may receive an activation message from a mobile device 12, the mobile device 12 storing at least a first service brand package associated with a first service network and a second service brand package associated with a second service network. In response to the activation message, the application 46 identifies at least one of the service packages stored on the mobile device 12, for example the first service package and based on the first service package, a reference to content is written over-the-air to the memory 24 of the mobile device 12. The application 46 may link the first service network to the mobile device 12 by looking up in a data store (not shown) a wireless communication service provisioned for the mobile device 12 with the first service package using an electronic serial number (ESN) of the first service package, other identifying information of the first service package and/or combinations thereof. One of ordinary skill in the art will appreciate after reading this disclosure the various ways a provisioning server, such as service awareness provisioning server 40, may identify a particular activation message from a service package.

It should be noted that the service awareness provisioning server 40 may also reside in a distribution outlet or warehouse, and that some or all provisioning events may be completed in the distribution outlet. This would allow branding and customization to be accomplished prior to sending a plurality of mobile devices 12 to a retail point of sale or a large enterprise customer, whom all want to sell and/or use the mobile device on a particular service brand network, for example.

Figure 2:
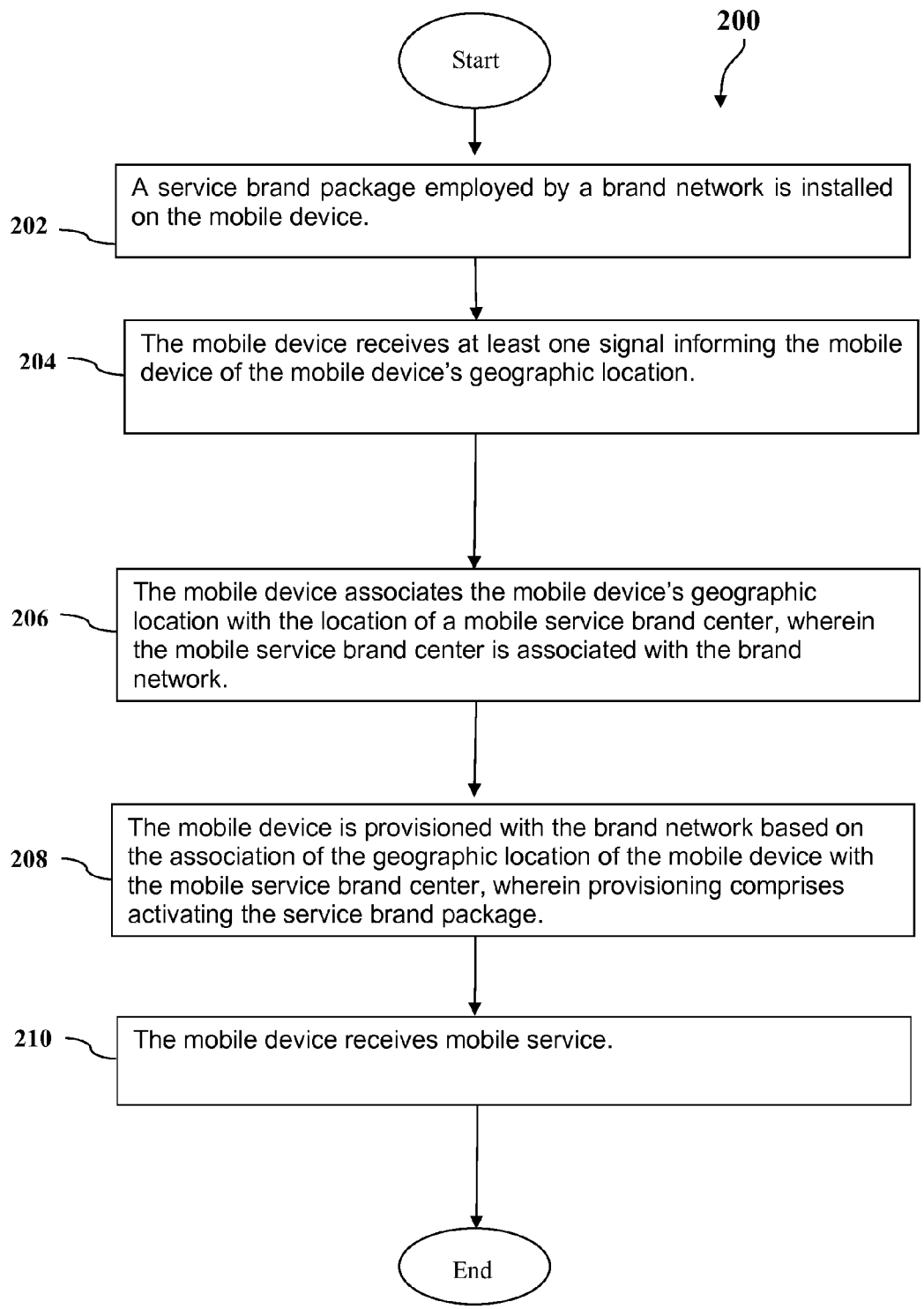
FIG. 2 is a flow chart of a method according to an embodiment of the disclosure.

In FIG. 2, a method 200 is described. At block 202, a service brand package associated with a service brand network may be installed on the mobile device. In an embodiment, the manufacturer of the mobile device may be instructed, for example by a specification, to install a service brand package associated with a service brand network on the mobile device. Additionally, a service brand package may be installed, at least partially, on the mobile device when the mobile device enters a mobile service brand center. A mobile service brand center may comprise a retail store, a distribution and/or redistribution outlet, a mobile service brand kiosk, a location where the mobile device is at least partially packaged and/or assembled, and/or the like. The service package may be configured to provision the mobile device with a service brand network. The service brand package may be installed in the memory of the mobile device, such as memory 24.

In an embodiment, a second service brand package associated with a second service brand network may be installed on the mobile device. In an embodiment, the manufacturer of the mobile device may be instructed, for example by a specification, to install a second service brand package associated with a second service brand network on the mobile device. Additionally, a second service brand package may be installed, at least partially, on the mobile device when the mobile device enters a mobile service brand center. The second service brand package may be configured to provision the mobile device with a second brand network. In an embodiment, the second brand network may be associated with a different geographic area than the first brand network as will be discussed further herein. The second service brand package may be installed in the memory of the mobile device, such as memory 24. It is understood that these one or more service brand packages may be stored on the mobile device at the same time and one or more shall be stored on the mobile device in a dormant state.

In an embodiment, a third, fourth, and/or fifth service brand package employed by a third, fourth, and/or fifth service brand may be installed on the mobile device. One of ordinary skill in the art will appreciate after reading this disclosure the quantity of additional service brand packages which may be installed on the mobile device.

At block 204, the mobile device may receive one or more signals. In an embodiment, receiving one or more signals may comprise receiving a signal informing the mobile device of the geographic location of the mobile device, where the geographic location is associated with a mobile service brand center such as a retail store and/or a brand distribution outlet. For example, the mobile device may receive a global positioning system (GPS) signal informing the mobile device that it is located at a Boost Mobile retail store. A geographical location may be associated with a particular mobile service brand center associated with a particular service brand network such that when the mobile device receives a GPS signal informing the mobile device of its location, the mobile device may associate its location with a particular mobile service brand center associate with a particular service brand network. The mobile device may then provision with the particular service brand network associated with the mobile service brand center by activating the installed service brand package associated with the particular service brand network and by request provisioning data from a server for that particular service brand to be installed with the particular service brand package. For example, a mobile device may receive a GPS signal indicating that the mobile device is at a shopping center with a Sprint mobile service brand center. Upon receiving the signal, the mobile device may use a location based look-up table which matches geographical locations with a mobile service brand center and associates the mobile service brand center with a service brand network. If the mobile device determines, using the location-based look-up table, that the mobile device is located at location associated with the Sprint mobile service brand center, the mobile device will trigger activation of the Sprint service brand package previously installed in the mobile device.

In an embodiment, if the mobile device determines that the location of the mobile device is not associated with a mobile service brand center and thus a service brand package stored on the mobile device, then none of the service packages on the mobile device may be activated. Additionally, in an embodiment, once the mobile device has been provisioned with a service brand network, another service brand package may not be activated on the mobile device without gaining permissions from the mobile device manufacturer and/or the previously activated service brand. For example, if the mobile device is receiving service on a Boost network, but the mobile device then receives a second signal to provision with a Sprint network, the mobile device may not provision with the Sprint Network because the mobile device is already provisioned with the Boost network. Additionally, the mobile device may be provisioned with the Sprint network if the manufacturer of the mobile device and/or Boost allows the mobile device to be removed from the Boost network.

In an embodiment, receiving at least one signal on the mobile device may comprise receiving an SID/NID signal from a BTS tower. A first location may be associated with an SID/NID signal from a first BTS tower (e.g. a tower associate with a first power range) and a second location may be associated with an SID/NID signal from a second BTS tower (e.g. a tower associated with a second power range). The mobile device may access a look-up table which authenticates the SID/NID signal with either a first location and/or the second location and associated the location with a mobile service brand center associated with a particular service brand. For example, a mobile device may receive an SID/NID signal of a particular BTS tower. Upon receiving the signal, the mobile device may use a lookup table which associates the location of the BTS tower with a first location and a Sprint mobile service brand center. If the mobile device determines, using the lookup table, that the signal received from the BTS tower is associated with a first location and, for example a Sprint store, the mobile device will activate a Sprint service brand package associated with the first location and the Sprint mobile service brand center.

Conversely, if the mobile device determines that the received signal is not associated with a service brand package stored on the mobile device, then none of the service brand packages on the mobile device may be activated.

In an embodiment, the mobile device may receive an SID/NID identification signal identifying a particular BTS which is closest to a Virgin Mobile mobile service brand center. For example, a mobile device manufacturer may have contracted to send a shipment of mobile devices to a Virgin Mobile mobile service brand center in Sarasota, Fla. The manufacturer may have installed one or more service brand packages on the mobile device including a service brand package associated with Virgin Mobile. The one or more service brand packages including the Virgin Mobile service brand package may have been installed on the mobile devices before the manufacture knew they would send this shipment of mobile devices to a Virgin Mobile mobile service brand center. Thus, when the shipment of mobile devices are delivered to the Virgin Mobile mobile service brand center in Sarasota, Fla., the BTS located closest to the Virgin Mobile mobile service brand center may send a signal received by each of the mobile devices in the shipment of mobile devices informing the mobile devices of their location. In this case, the signal would inform the mobile devices that they are Virgin Mobile mobile devices. One of ordinary skill in the art will appreciate after reading this disclosure the various embodiments by which a mobile device may determine its geographic location.

In an embodiment, the mobile device may receive a signal, such as a near field communication signal, a WiFi signal, and/or the like. For example, a mobile device may be delivered to a Sprint store. In an embodiment, the mobile device may receive a signal from a local WLAN connection in the Sprint mobile service brand center informing the mobile device that it is located in that particular Sprint mobile service brand center. For example, a mobile device manufacturer may have contracted to send a shipment of mobile devices to a Sprint mobile service brand center in Grand Rapids, Mich. The manufacturer may have installed one or more service brand packages on the mobile device including a service brand package associated with Sprint. The one or more service brand packages including the Sprint service brand package may have been installed on the mobile devices before the manufacture knew they would send this shipment of mobile devices to a Sprint store. Thus, when the shipment of mobile devices are delivered to the Sprint mobile service brand center in Grand Rapids, Mich., a local WLAN within the Grand Rapids Sprint retailer store sends a signal received by each of the mobile phone of the shipment of mobile devices informing the mobile devices of their location.

In an embodiment, receiving a network identification signal on the mobile device may comprise receiving a global positioning signal informing the mobile device of its geographical location. A first mobile service brand center brand may be associated with a first geographical area and a second mobile service brand center brand may be associated with a second geographical area, wherein the first geographical area and the second geographical area are not the same geographical area. In an embodiment, the first geographical area and the second geographical area may not overlap. The mobile device may access a lookup table which authenticates the GPS signal with either a first mobile service brand center and/or a second mobile service brand center. For example, a mobile device may receive a GPS signal indicating that the mobile device is in a particular geographical location. Upon receiving the signal, the mobile device may use a lookup table which authenticates GPS signals with mobile service brand centers. If the mobile device determines, using the lookup table, that the location of the mobile device is located within a geographical area associated with a Sprint mobile service brand center, the mobile device will provision and/or activate a Sprint service brand package stored on the mobile device. Conversely, if the mobile device determines that the location of the mobile device is not associated with a particular mobile service brand center brand which is associated with a service brand package stored on the mobile device, then none of the service brand packages on the mobile device may be provisioned and/or activated. In another embodiment, if the mobile device determines that the received signal is not associated with a service brand package stored on the mobile device, then the service brand package associated with the geographical area closest to the mobile device may be activated.

In an embodiment, the mobile device may receive both an SID/NID signal and a GPS signal. For example, the mobile device may be taken to a particular geographic area, for example, a Boost Mobile retail store in a mall. The mobile device may then receive an SID/NID signal from a BTS. At or near the same time, the mobile device may also receive a GPS signal from which the mobile device determines its location. The mobile device may use both the SID/NID signal and the GPS signal to triggers the activation of a Boost Mobile service package stored on the mobile device.

In an embodiment, the mobile device may map a received GPS signal after attempting to map a received SID/NID signal. For example, the mobile device may receive an SID/NID signal from a BTS having a signal strength that does not fall within a range associated with a network which can be mapped with one of the service brand packages stored on the mobile device. The mobile device may then map a GPS signal received by the mobile device, which implies a location based on GPS coordinates. Through a lookup table and the implied mobile device location, the mobile device maps which mobile service brand center is closest to the mobile device and triggers the activation of the service package associated with that mobile service brand center.

In an embodiment, the mobile device may map a received GPS signal after failing to receive at least one SID/NID signal. For example, a mobile device may be in a remote location out of signal range from a BTS tower. After a predetermined period of time where the mobile device does not receive an SID/NID signal, the mobile device may then use the GPS coordinates to map, select, and trigger activation to the appropriate service brand package stored on the mobile device.

In an embodiment, the mobile device may map a received GPS signal after detecting two or more SID/NID signals associated with two or more mobile service brand center brands. For example, a Virgin Mobile service brand package and a Sprint service brand package may be stored on a particular mobile device. The mobile device may have been shipped to a Sprint mobile service brand center which happens to be adjacent to a Virgin Mobile mobile service brand center. The mobile device may detect an SID/NID signal associated with the Sprint mobile service brand center and an SID/NID signal associated with the Virgin Mobile mobile service brand center. Upon receiving two SID/NID signals associated with different mobile service brand center brands, the mobile device may then detect, using a GPS signal, that the mobile device is located in the Spring mobile service brand center (for example, by using a look-up table). The mobile device may then trigger activation to the Sprint service brand package stored on the mobile device.

At block 206, the mobile device may associate its geographic location with the location of a mobile service brand mobile service brand center, wherein the mobile service brand retailer is associated with the brand network. In an embodiment, a location based look-up table may be installed on the mobile device, for example, by the manufacturer of the mobile device. Thus, when the mobile device receives a signal identifying the location of the mobile device, the mobile device may access the location based look-up table and match the location of the mobile device with the location of a service brand mobile service brand center. The same look-up table and/or a separate look-up table may associate the mobile service brand center with a particular service brand. In an embodiment, the mobile device may receive a signal which directs the mobile device to locate a look-up table stored in a server. The look-up table stored in the server allows the mobile device to associate a signal with a particular mobile service brand center and/or associate a particular mobile service brand center with a particular service brand. One of ordinary skill in the art will appreciate after reading this disclosure the various embodiments by which a signal may direct the mobile device to a look-up table stored in a server.

In an embodiment, the mobile device may receive a SID/NID signal from, for example, a BTS. The mobile device may then identify a particular service brand network, such as at least a first network or at least a second network based on the SID/NID identification signal identifying a particular BTS. For example, a mobile device may receive an SID/NID identification signal identifying a particular BTS. Upon identifying the particular BTS, the mobile device may access a lookup table which maps the location of the particular BTS with a Sprint mobile service brand center. The mobile device may identify that a Sprint mobile service brand center is the closest mobile service brand center to that particular BTS, and thus authenticate the location of the mobile device with the Sprint mobile service brand center. In an embodiment, the SID/NID identification signal may direct the mobile device to a remote location storing the lookup table. Conversely, the lookup table may be stored on the mobile device. Once mapped, the signal triggers the activation of the first service brand package associated with the first network.

As previously discussed, in an embodiment, receiving one or more signals may comprise receiving an SID/NID identification signal identifying a particular BTS. In an embodiment, a first service brand package associated with a first mobile service brand center brand (and a first service network) and a third service brand package associated with a third mobile service brand center brand (and a third service network) may be stored on the mobile device. However, a second service brand package associated with a second mobile service brand center brand (and a second service network) may not be stored on the mobile device. The first mobile service brand center brand may be associated with an SID/NID signal within a first power range, the second mobile service brand center brand may be associated with an SID/NID signal within a second power range, and the third mobile service brand center brand may be associated with a third power range, wherein the first power range, the second power range, and the third power range are not the same power ranges.

In an embodiment, the first power range, the second power range, and the third power range may not overlap. The mobile device may receive a signal from the BTS of the first power range and the second power range, but not the third power range. The mobile device may access a lookup table which maps the SID/NID signal with the first mobile service brand center brand, but not the third mobile service brand center brand because the BTS only sent out signal with power ranges associated with the first and second mobile service brand center brands. The mobile device may then associate the first signal with the first mobile service brand center and a first service brand package stored on it. The mobile device may request provisioning data for the first service brand package based on the mapping of the SID/NID signal associated with the first mobile service brand center brand. For example, a mobile device may receive an SID/NID signal at a first power level. Upon receiving the signal, the mobile device may use a lookup table which maps signal power ranges with service networks. The mobile device maps the power level received by the SID/NID signal with the range of power levels for each network listed in the lookup table to determine which mobile service brand center the mobile device is closest to and which service brand package stored on the mobile device will be triggered for activation. Conversely, if the mobile device determines that the received signal is not associated with a mobile service brand center brand and thus a package stored on the mobile device, then none of the service packages on the mobile device may be triggered for activation.

At block 208, the mobile device is provisioned with either the first network or the second network based on the identification of a mobile service brand center associated with at least one network from the signal received by the mobile device. For example, based on an SID/NID signal and/or a GPS signal received by the mobile device identifying a particular mobile service brand center, the mobile device may trigger the activation of an appropriate service package on the mobile device. After triggering the activation of the appropriate service package, the mobile device may request provisioning data from a server and install provisioning data with the activated service brand package. By installing the provision data with the activated service brand package, the mobile device may be provisioned with a particular network, such as a first network or a second network.

In an embodiment, the mobile device may trigger activation of a particular service brand package and request provisioning data after a duration of time. The duration of time may be a duration of time that a signal is received from a particular BTS tower, a particular WLAN, a signal indicating a particular location determined by a GPS signal, and/or the like. In an embodiment, the duration of time may be a continuous duration of time. For example, a mobile device may be shipped from a manufacturer with a first, second, and third service brand package stored on it. As the mobile device is in transport to its final destination (e.g. a retail store or a distribution outlet), the mobile device may be transported past one or more mobile service brand centers associated with a first, second or third brand.

As the mobile device moves past a retailer store associated with the second brand, the mobile device may receive a signal associating the mobile device with the second brand. However, the mobile device may only be able to receive the second brand signal for a period of time shorter than the continuous duration of time needed to activate the second service brand package. In this embodiment, the mobile device may pass by multiple mobile service brand centers associated with a first, second, and/or third brand without triggering activation of a service brand package and without triggering the request for provisioning data. Additionally, once the mobile device has arrived at its final destination, for example, at a retail store before its sale, the mobile device may receive a signal from the retailer associated with, for example, a second service brand for a period at least as long as the duration of time so that the mobile device may activate the second service brand package and request provisioning data for the second service brand package. The continuous duration of time may be between 1 minute and 1 month. In an embodiment, the duration of time may be any amount of time determined by the shipping route of the mobile device from the manufacturer to the retail store and/or distribution outlet.

In an embodiment, the duration of time may be an accumulated duration of time. For example, the mobile device may be shipped from the manufacturer with a first, second, and third service brand package stored on the mobile device. The mobile device distribution administrators may determine that the mobile device will not be provisioned with a retailer associated with the first brand package and thus ship the mobile device to a distribution outlet associated with both the second brand and the third brand. The mobile device may receive signals associated with the second and third brands while at the distribution outlet but for a time less than the duration of time, for example 24 hours. For this example, the duration of time may be 30 hours. While at the distribution outlet, an administrator may determine that the mobile device is to be shipped to a retailer associated with the third service brand. Thus, because the mobile device had already received a signal associated with the third service brand for 24 hours, once the mobile device receives the signal associated with the third service brand at the retailer store, the mobile device will activate the third service brand package and request provisioning data after only 6 hours instead of 30 hours.

At block 210, the method may further comprise that the mobile device receives mobile service. For example, once the mobile device is provisioned with the first network, the mobile device may receive mobile service through the first network. In an embodiment, receiving mobile service may comprise sending and/or receiving a text, phone call, internet access, and/or the like.

Figure 3:
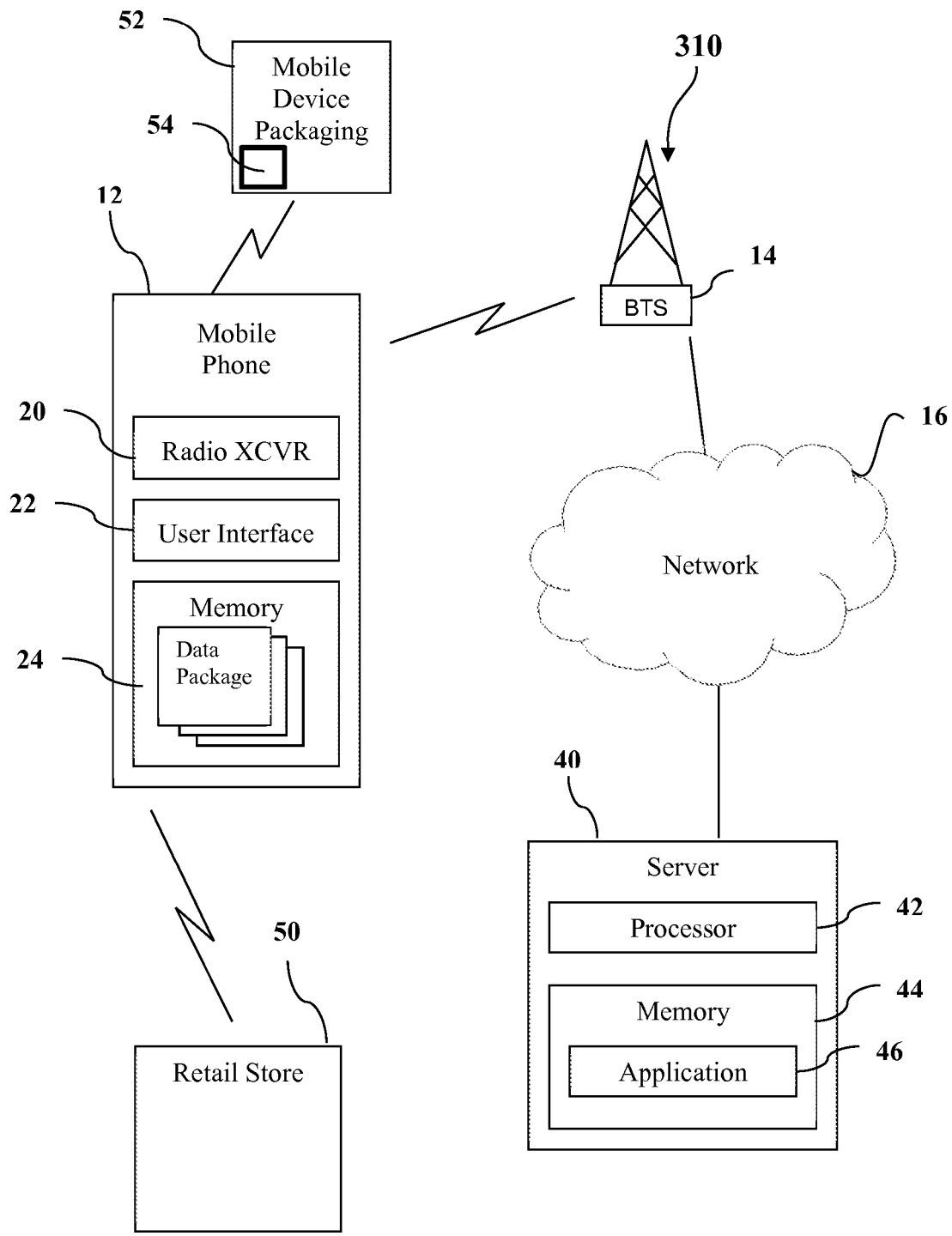
FIG. 3 is a block diagram of a provisioning system and labeling system according to an embodiment of the disclosure.

Turning now to FIG. 3, a communication system 310 is described. In the embodiment of FIG. 3, the system 310 may comprise similar features to the embodiment of FIG. 1. Additionally, the system 310 further comprises a mobile device shipping package 52 for packaging and shipping the mobile device 12. The mobile device shipping package 52 may comprise a label 54. The label 54 is configured to display, in response to receiving a signal from the mobile device 12 and/or one or more signals as previously described herein, at least one or more images associated with a brand network. The images may comprise at least one or more symbols and/or at least one or more alpha-numeric characters associated with a service brand network. In an embodiment, the label 54 may be located on the external portion of the packaging used in shipping the mobile device 12. In an embodiment, the label 54 may also be located on the outside of the casing of the mobile device itself. The label 54 may comprise a label that is selectively irradiated to display one of a plurality of dormant brand labels. One of ordinary skill in the art will appreciate after reading this disclosure the various embodiments by which a label may be instructed to display one or more symbol and/or one or more alpha-numeric characters.

Figure 4:
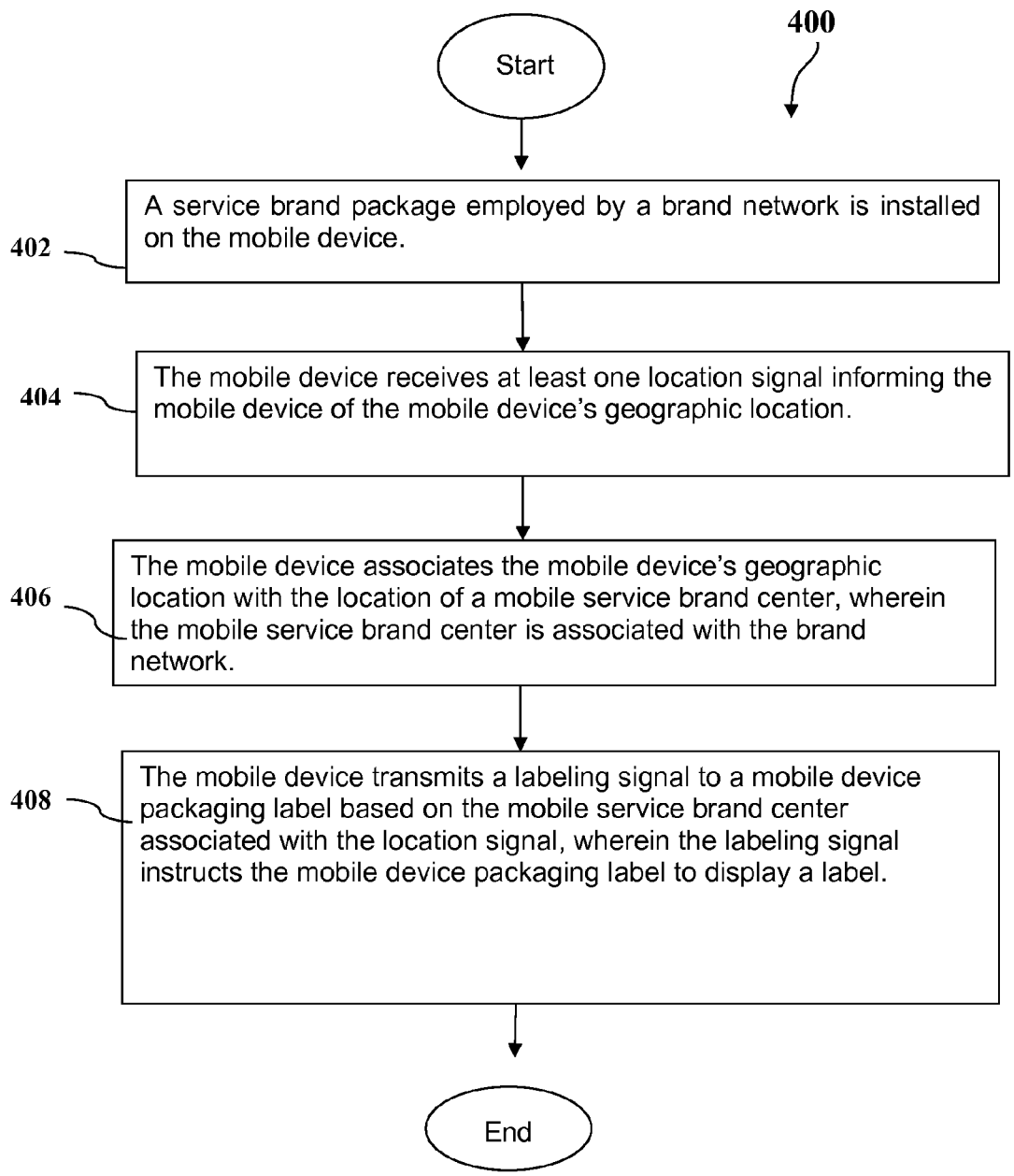
FIG. 4 is a flow chart of a method according to an embodiment of the disclosure.

In FIG. 4, a method 400 is described. At block 402, one or more service brand packages employed by one or more service brand network may be installed on the mobile device. The first service brand package may be installed in the memory of the mobile device, for example, memory 24. At block 404, the mobile device may receive one or more signals. As previously discussed, receiving one or more signals may comprise receiving a signal informing the mobile device of the geographic location of the mobile device, where the geographic location is associated with a mobile service brand center. At block 406, the mobile device may associate its geographic location with the location of a mobile service brand center, wherein the mobile service brand center is associated with the service brand network.

At block 408, the mobile device transmits a labeling signal to a mobile device packaging label based on the mobile service brand retailer associated with the location signal wherein the labeling signal instructs the mobile device packaging label to display a label. For example, the mobile device may transmit a labeling signal to the mobile device packaging label after associating a received signal with the geographic location of a mobile device retailer. In an embodiment, the labeling signal may comprise a unique identifier so that the label may not display one or more images based on the transmission of a labeling signal for a mobile device that is not associated with the label.

For example, a mobile device may be stored in a shipment of mobile devices. Each mobile device may have at least one label on the packaging for the mobile device. All of the mobile devices in the shipment may transmit labeling signals to the labels on their packages. In this case, because the labeling signal comprises a unique identifier, the label on the package will only display an image based on the label signal sent from mobile device associated with it (i.e. the mobile device in the package). In an embodiment, one or more mobile devices and/or packaging storing the one or more mobile devices may be irradiated with a signal to cause the label to selectively express one of a plurality of dormant hidden brands.

In an embodiment, the mobile device may transmit a labeling signal to a mobile device packaging label at substantially the same time that the mobile device activates a particular service brand package stored on the mobile device and/or at substantially the same time that the mobile device requests provisioning data. In an embodiment, substantially the same time may comprise any time from exactly the same time a service brand package is activated and/or exactly the same time provisioning data is requested to a time after all provisioning data has been received and/or a service brand package has been activated. Additionally, the mobile device may transmit a labeling signal to a mobile device packaging label after detecting one or more signals and associating the one or more signals with a mobile service brand center brand. For example, a mobile device may be transported past several retail stores of several different brands. As the mobile device passes by each store, the mobile device detects a signal indicating a location associated with a brand and transmits a labeling signal to one or more mobile device packaging labels. In this embodiment, the mobile device packaging label may change labels several times. In an embodiment, the mobile device packaging label may lock into a particular label when the mobile device receives provisioning data associated with a particular brand and/or receives a label locking signal, for example from a WLAN in a retail store. In this embodiment, the provisioning data may provide a code to the mobile device that may be transmitted to the mobile device packaging label to lock a particular label in place. The particular label may be associated with the same brand which the mobile device is provisioning with.

In an embodiment, the mobile device may transmit a labeling signal to a mobile device packaging label based on the mobile service brand retailer associated with the location signal wherein the labeling signal instructs the mobile device packaging label to display a label after a duration of time. The duration of time may be a duration of time that a signal is received from a particular BTS tower, a particular WLAN, a signal indicating a particular location determined by a GPS signal, and/or the like. In an embodiment, the duration of time may be a continuous finite duration of time. For example, a mobile device may be shipped from a manufacturer with a first, second, and third service brand package stored on it.

As the mobile device is in transport to its final destination (e.g. a retail store and/or a distribution outlet), the mobile device may be transported past one or more mobile service brand centers associated with a first, second or third brand. As the mobile device moves past a retailer store associated with the second brand, the mobile device may receive a signal associating the mobile device with the second brand. However, the mobile device may only be able to receive the second brand signal for a period of time shorter than the continuous duration of time need to activate the second service brand package. In this embodiment, the mobile device may pass by multiple mobile service brand centers associated with a first, second, and/or third brand without triggering activation of a service brand package and without triggering the transmission of a labeling signal from the mobile device to the label to display one or more images. Additionally, once the mobile device has arrived at its final destination, for example, before sale, the mobile device may receive a signal from the retailer associated with, for example, a second service brand for a period at least as long as the duration of time so that the mobile device may transmit a labeling signal to a mobile device packaging label based on the second mobile service brand retailer associated with the location signal.

The labeling signal may instruct the mobile device packaging label to display a label associated with the second brand. The continuous duration of time may be between 1 minute and 1 month. In an embodiment, the finite duration of time may be any amount of time determined by the shipping route of the mobile device from the manufacturer to the retail store and/or distribution outlet.

In an embodiment, the duration of time may be an accumulated duration of time. For example, the mobile device may be shipped from the manufacturer with a first, second, and third service brand package stored on the mobile device. The mobile device distribution administrators may determine that the mobile device will not be provisioned with a first brand package associated with a particular retailer and thus ship the mobile device to a distribution outlet associated with both the second brand and the third brand.

The mobile device may receive signals associated with the second and third brands while at the distribution outlet but for a time less than the duration of time, for example 24 hours. Thus, the mobile device will not transmit a labeling signal to one or more labels associated either the second or third brands because the total amount of time the mobile device has received a signal associated with the second brand or the total amount of time the mobile device has received a signal associated with the third brand is less than the total amount of time needed to trigger the transmission of labeling signal from the mobile device to one or more labels. For this example, the duration of time may be 30 hours. While at the distribution outlet, an administrator may determine that the mobile device is to be shipped to a retailer associated with the third service brand. Thus, because the mobile device had already received a signal associated with the third service brand for 24 hours, once the mobile device receives the signal associated with the third service brand at the mobile service brand center, the mobile device will transmit a labeling signal to a mobile device packaging label based on the third mobile service brand retailer after 6 hours instead of 30 hours.

Additionally, if the mobile device had been shipped to a mobile service brand center associated with the second brand, the mobile device would transmit a labeling signal to a mobile device packaging label based on the second mobile service brand retailer after 6 hours instead of 30 hours. In the case of the third brand, the mobile device labeling signal will instruct the label to display one or more images associated with the third mobile service brand center brand after the accumulation of 30 hours of receiving the signal associated with the third brand.

Figure 5:
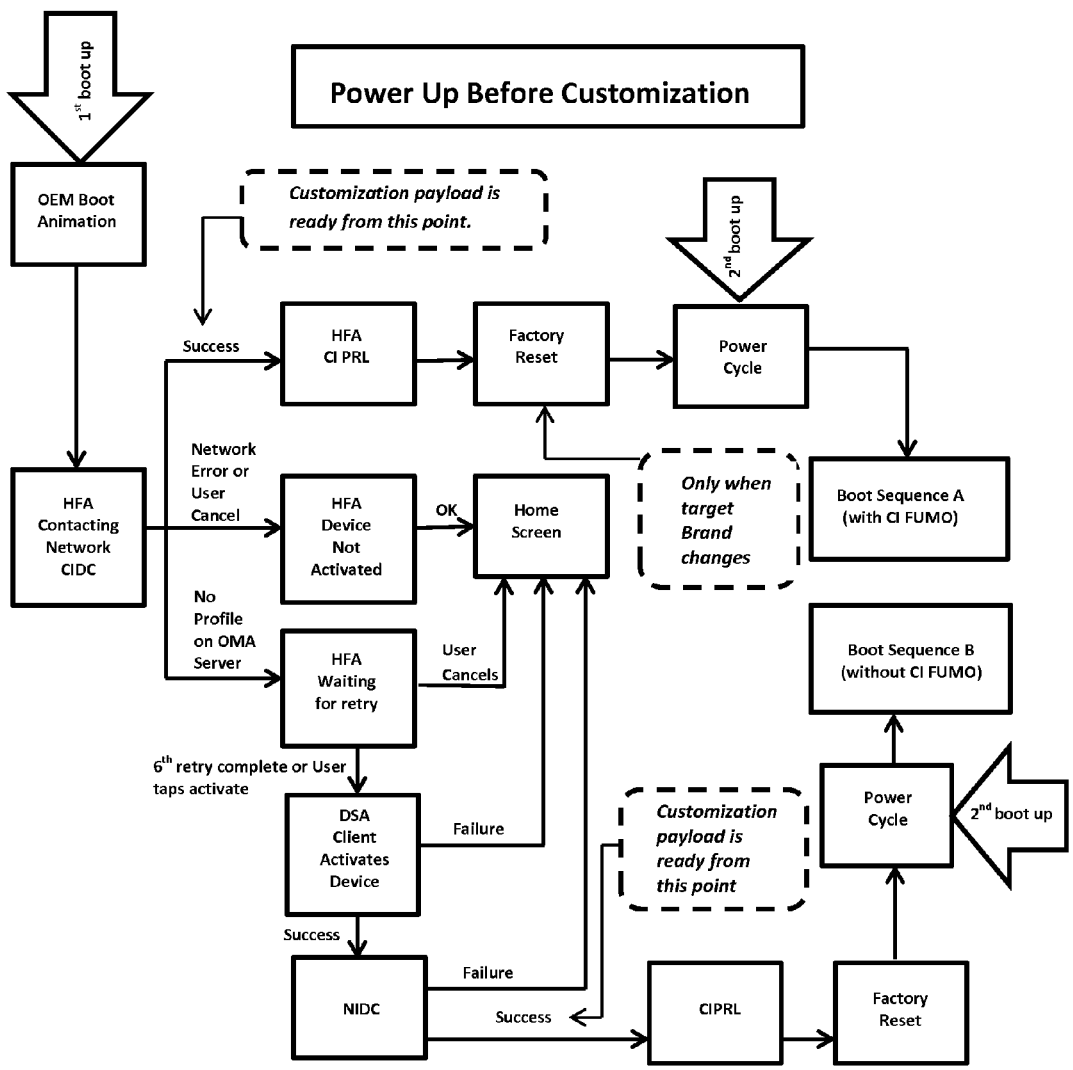
FIG. 5 is a flow chart of a method according to an embodiment of the disclosure.

FIG. 5 depicts a method of self-activating a mobile device. When a mobile device receives a signal, such as a high frequency activation signal, the mobile device may receive provisioning data to configure the mobile device with a particular service network and receive service through that particular service network. However, on occasion, the hands free activation signal may be severed from the mobile device before the mobile device is able to download all the provisioning data. After one or more attempts by either the mobile device or a server transmitting the hands free activation signal, the mobile device self-activating system may prompt a user to proceed with the provisioning and activation of the mobile device on a channel using a number assignment identifier associate with the mobile device and/or the mobile device service provider. The device self-activating system will know the proper channel to receive the remaining provisioning data and brand the mobile device based on a mobile device SKU or the number assignment identifier. The process does not require that the user of the mobile device perform a power cycle of the device to complete the payload activation.

Figure 6:
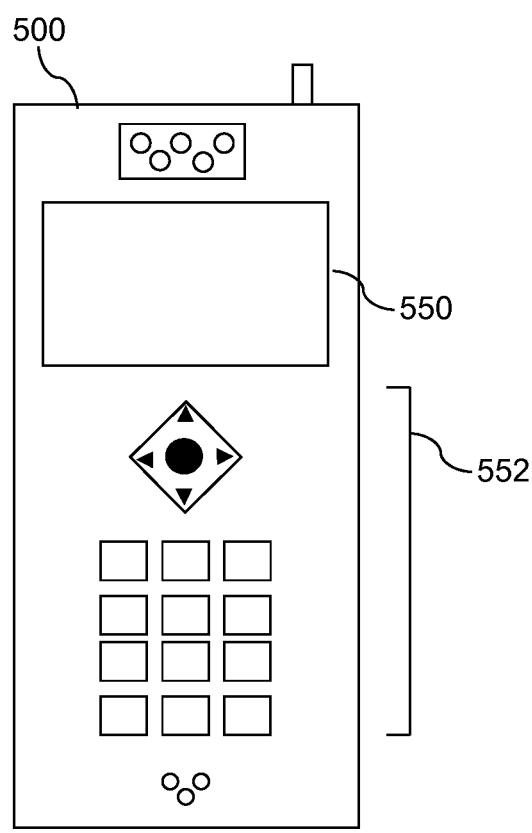
FIG. 6 is an illustration of a mobile device according to an embodiment of the disclosure.

FIG. 6 depicts the mobile device 500, which is operable for implementing aspects of the present disclosure, but the present disclosure should not be limited to these implementations. Though illustrated as a mobile phone, the mobile device 500 may take various forms including a wireless handset, a pager, a personal digital assistant (PDA), a gaming device, or a media player. The mobile device 500 includes a display 550 and a touch-sensitive surface and/or keys 552 for input by a user. The mobile device 500 may present options for the user to select, controls for the user to actuate, and/or cursors or other indicators for the user to direct. The mobile device 500 may further accept data entry from the user, including numbers to dial or various parameter values for configuring the operation of the handset. The mobile device 500 may further execute one or more software or firmware applications in response to user commands. These applications may configure the mobile device 500 to perform various customized functions in response to user interaction. Additionally, the mobile device 500 may be programmed and/or configured over-the-air, for example from a wireless base station, a wireless access point, or a peer mobile device 500. The mobile device 500 may execute a web browser application which enables the display 550 to show a web page. The web page may be obtained via wireless communications with a base transceiver station, a wireless network access node, a peer mobile device 500 or any other wireless communication network or system.

Figure 7:
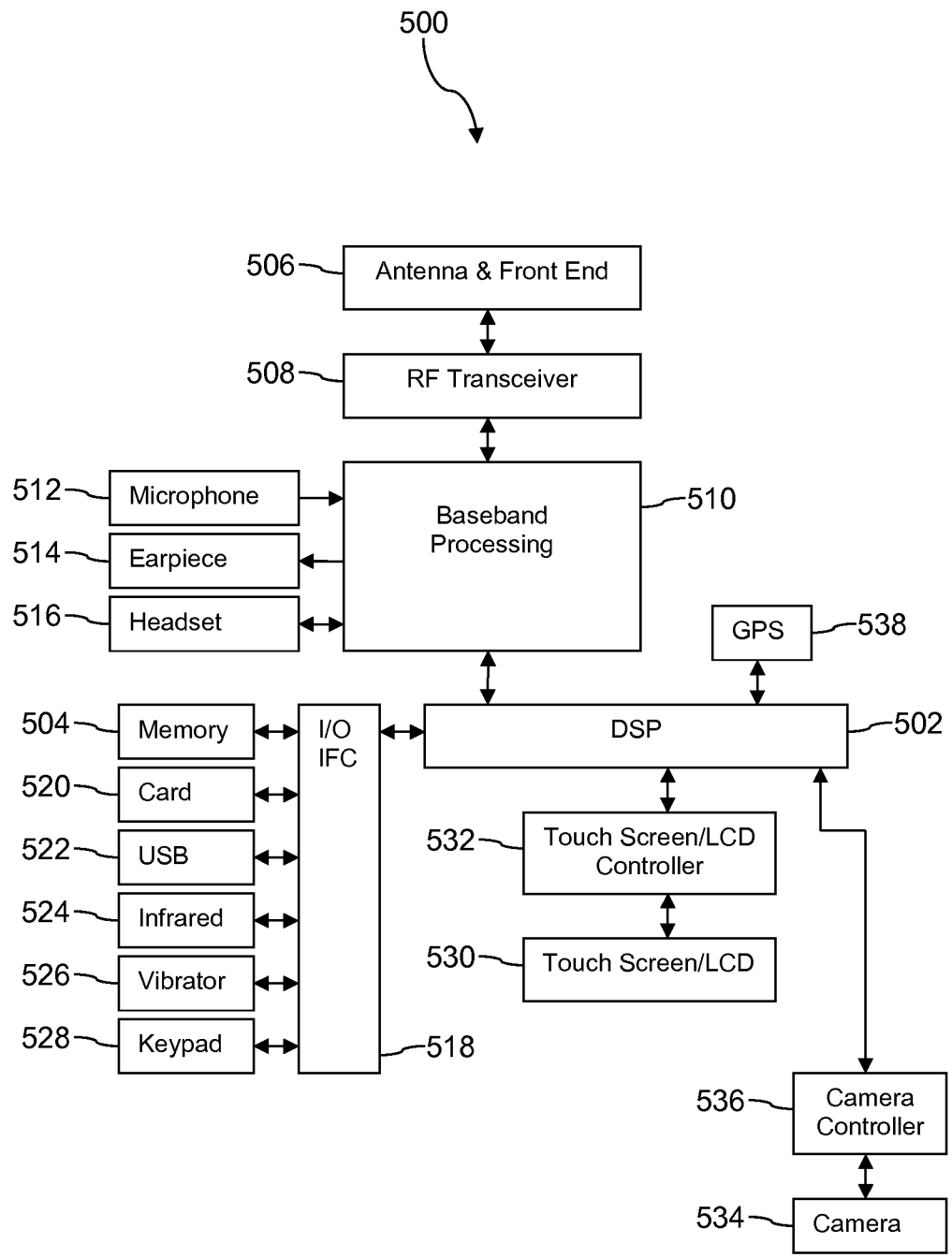
FIG. 7 is a block diagram of a mobile device according to an embodiment of the disclosure.

FIG. 7 shows a block diagram of the mobile device 500. While a variety of known components of handsets are depicted, in an embodiment a subset of the listed components and/or additional components not listed may be included in the mobile device 500. The mobile device 500 includes a digital signal processor (DSP) 502 and a memory 504. As shown, the mobile device 500 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 500 may include another kind of display that does not provide a touch sensitive screen. In an embodiment, the DSP 502 may communicate directly with the memory 504 without passing through the input/output interface 518. Additionally, in an embodiment, the mobile device 500 may comprise other peripheral devices that provide other functionality.

The DSP 502 or some other form of controller or central processing unit operates to control the various components of the mobile device 500 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 500 to function as a peripheral device to exchange information with a personal computer or other computer system. The infrared port 524 and other optional ports such as a Bluetooth® interface or an IEEE 802.11 compliant wireless interface may enable the mobile device 500 to communicate wirelessly with other nearby handsets and/or wireless base stations.

The keypad 528 couples to the DSP 502 via the interface 518 to provide one mechanism for the user to make selections, enter information, and otherwise provide input to the mobile device 500. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 500 to determine its position.

Figure 8A:
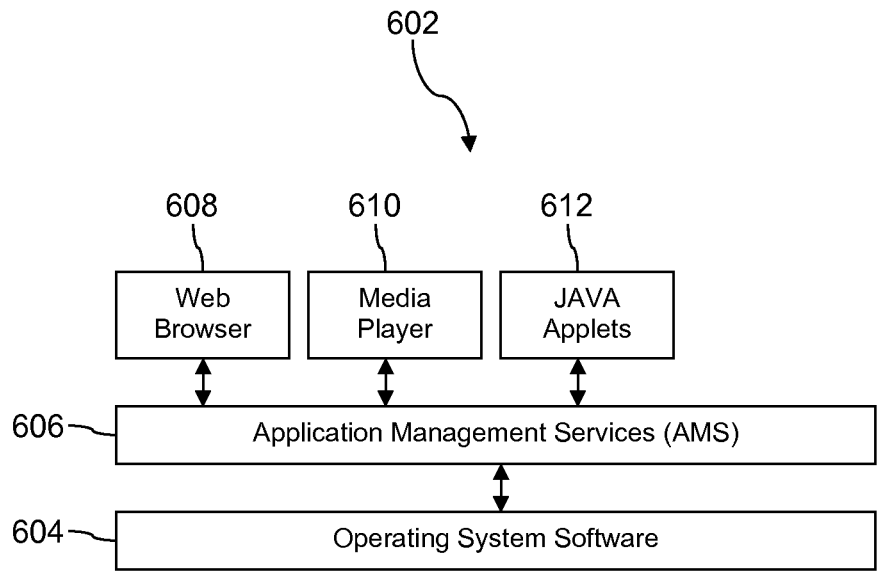
FIGS. 8A and 8B are block diagrams of software architecture for a mobile device according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 500. Also shown in FIG. 8A are a web browser application 608, a media player application 610, and JAVA applets 612. The web browser application 608 may be executed by the mobile device 500 to browse content and/or the Internet, for example when the mobile device 500 is coupled to a network via a wireless link. The web browser application 608 may permit a user to enter information into forms and select links to retrieve and view web pages. The media player application 610 may be executed by the mobile device 500 to play audio or audiovisual media. The JAVA applets 612 may be executed by the mobile device 500 to provide a variety of functionality including games, utilities, and other functionality.

Figure 8B:
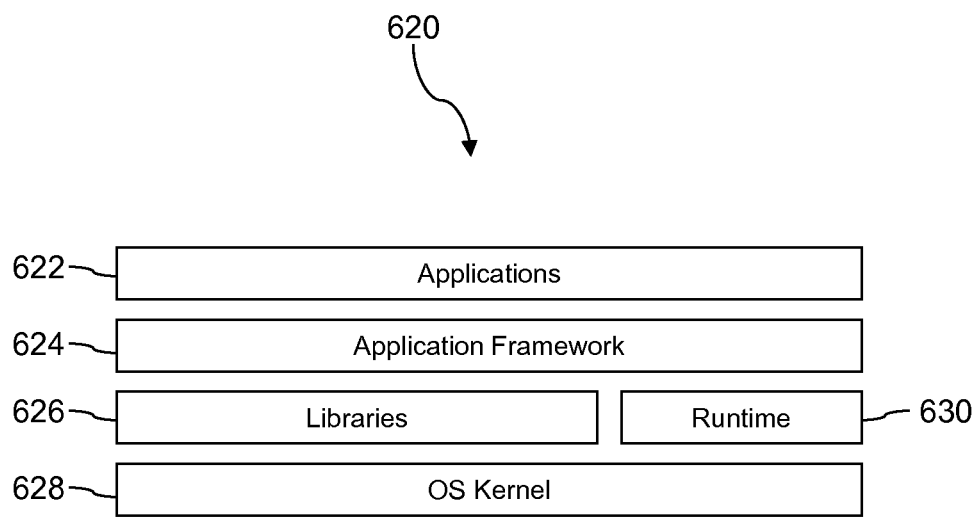

FIG. 8B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
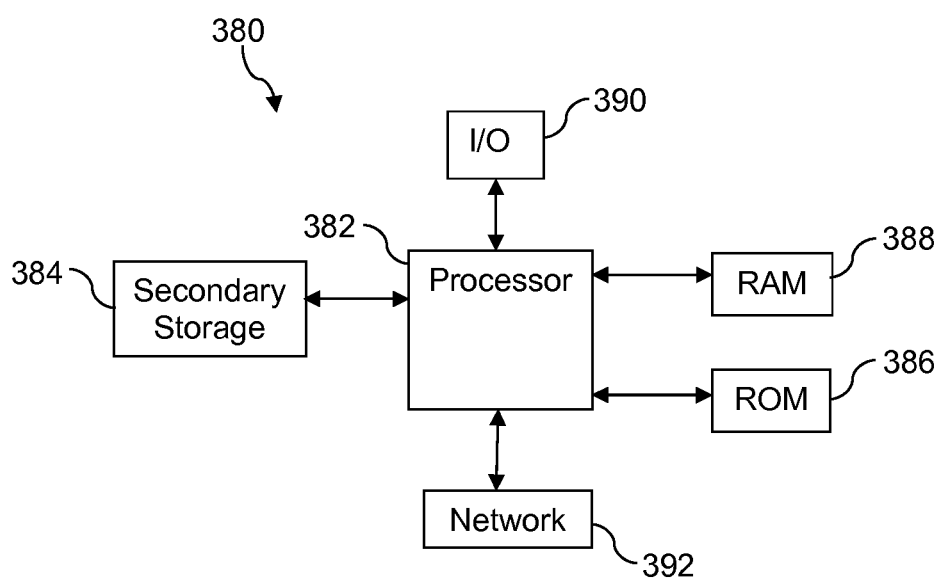
FIG. 9 is a block diagram of a computer system according to an embodiment of the disclosure.

FIG. 9 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of branding a mobile device, comprising:
installing, in a non-transitory memory of the mobile device, at least two service brand packages on the mobile device, wherein each service brand package: is configured to brand the mobile device with at least one service brand network of a plurality service brand networks, and is associated with a plurality of service brand centers;
receiving, via a transceiver of the mobile device, at least one signal on the mobile device, wherein the at least one signal is received based on a geographic location of the mobile device;
determining, by an application configuring the mobile device, the geographic location of the mobile device based on at least one signal received;
selecting, by the mobile device, a mobile service brand center at a location, stored in a look-up table, based on an association between the geographic location of the mobile device and the location of the mobile service brand center, wherein the mobile service brand center corresponds with one of the at least two service brand packages; and
activating, on the mobile device, the service brand package corresponding to the mobile service brand center based on the association of the geographic location of the mobile device with the location of the mobile service brand center, wherein at least the mobile device is branded and provisioned for use with at least one of the service brand networks in response to activating the service brand package.

2. The method of claim 1, the method further comprising receiving, on the mobile device, mobile service provided by the service brand network based on the mobile device being provisioned in response to activation of the service brand package on the mobile device.

3. The method of claim 1, wherein receiving at least one signal on the mobile device comprises receiving at least one of a global positioning system (GPS) signal, a WLAN signal, or a local base transceiver station (BTS) signal.

4. The method of claim 1, the method further comprising:
 installing, in the non-transitory memory of the mobile device, the look-up table on the mobile device,
 wherein the lookup table comprises: locations for each of the plurality of service brand centers corresponding to each service brand package, and
 wherein selecting the mobile device service brand center is based on correlating, via the look-up table, the at least one signal received with the location of the mobile service brand center and the geographic location of the mobile device.

5. The method of claim 1, wherein at least one signal received on the mobile device comprises data that is associated with at least one of a System Identification Number or a Network Identification Number.

6. The method of claim 5, the method further comprising;
 authenticating, by the mobile device via the lookup table, the at least one signal based on a power level of the at least one signal correlated with range of power levels for each service brand network at the locations of the mobile service brand centers and geographic location of the mobile device.

7. The method of claim 6, wherein activating the service brand package on the mobile device for one of the plurality of service brand networks is based at least on the at least one signal received being within the range of power levels for the location of the mobile service brand center for a predefined duration of time.

8. The method of claim 6, wherein the look-up table is stored in a non-transitory memory on the mobile device, and wherein activating the service brand package on the mobile device is based at least on the association between the geographic location of the mobile device and the location of the mobile service brand center being the same in response to expiration of a predefined duration of time.

9. The method of claim 6, wherein the mobile device is triggered to access the look-up table in a non-transitory memory at location that is different from the geographic location of the mobile device.

10. A system for branding a mobile device, comprising:
 a mobile device comprising:
  a processor;
  a transceiver; and
  a non-transitory memory storing an application that in response to execution by the processor, configures the mobile device to:
   store a plurality of service brand packages in the non-transitory memory of the mobile device, wherein each service brand package: is configured to brand the mobile device with a service brand network, and is associated with a plurality of service brand centers,
   identify a geographical location of the mobile device based on reception of at least one signal via the transceiver,
   select a mobile service brand center at a location, stored in a look-up table, based on an associated between the geographic location of the mobile device and the location of the mobile service brand center, wherein the mobile service brand center corresponds with one of the plurality of service brand packages stored in the non-transitory memory, and
   activate the service brand package corresponding to the mobile service brand center on the mobile device based on the association of the geographic location of the mobile device with the location of the mobile service brand center, wherein at least the mobile device is branded and provisioned for use with the service brand network in response to activation of the service brand package.

11. The system of claim 10, wherein the mobile device is further configured to: receive mobile service for wireless communication provided by the service brand network based on the mobile device being provisioned in response to activation of the service brand package on the mobile device.

12. The system of claim 10, wherein the at least one signal comprises at least a global positioning system (GPS) signal, at least one WLAN signal, or at least one local base transceiver station (BTS) signal.

13. The system of claim 10, wherein the mobile device is configured to store look-up table in a non-transitory memory on the mobile device and associate the geographic location of the mobile device with the location of the mobile service brand center by matching, via the location based look-up table, geographic locations with mobile service brand center.

14. The system of claim 10, wherein at least one signal received on the mobile device comprises at least one of a System Identification Number signal or a Network Identification Number signal.

15. The system of claim 14, wherein the mobile device is configured to authenticate at least one of signal received on the mobile device by comparing a power level of the at least one signal a range of power levels for each service brand network at the locations of the mobile service brand centers via the look-up table stored on the mobile device.

16. The system of claim 15, wherein the service brand package is activated on the mobile device based at least on the authentication of at least of the System Identification Number signal or the Network Identification Number signal.

17. A method of branding a mobile device and packaging, comprising:
 installing, in a non-transitory memory by the mobile device, a service brand package on the mobile device, wherein the service brand package is configured to brand the mobile device with a service brand network, and wherein the service brand package is associated with a plurality of service brand centers;
 receiving, via a transceiver of the mobile device, at least one location signal on the mobile device, wherein the location signal is received based on a geographic location of the mobile device;
 determining, by the mobile device configured by executing an application, the geographic location of the mobile device based on receiving the at least one location signal;
 associating, by the mobile device, the geographic location of the mobile device with a location of a mobile service brand center stored in a look-up table, wherein the mobile service brand center is associated with a brand network;

selecting, by the mobile device, the service brand package that corresponds with the location of the mobile service brand center;

activating, on the mobile device, the service brand package selected for the mobile service brand center, wherein at least the mobile device is branded and provisioned for use with the brand network in response to activating the service brand package; and transmitting, from the mobile device, a labeling signal comprising labeling information to a packaging label for the mobile device based on the association of the geographic location of the mobile device with the mobile service brand center that is associated with the location signal, wherein the labeling information configures the packaging label to visually display information.

18. The method of claim 17, wherein the packaging label for the mobile device is an electronic device that is disposed at least on an external portion of packaging used in shipping the mobile device.

19. The method of claim 1, further comprising: transmitting, by the mobile device, label information to a packaging label device affixed to packaging associated with the mobile device in response to activating the service brand package, wherein the label information configures the packaging label device to visually display information associated with at least one of: the service brand network, the mobile service brand center, or the mobile device.

20. The method of claim 8, wherein the mobile device is further configured to transmit label information to an packaging label device affixed to packaging associated with the mobile device in response to the activation of the service brand package, wherein the label information configures the packaging label device to visually display information associated with at least one of: the service brand network, the mobile service brand center, or the mobile device.

* * * * *